United States Patent
Sugie et al.

(10) Patent No.: US 10,471,918 B2
(45) Date of Patent: Nov. 12, 2019

(54) OCCUPANT PROTECTION APPARATUS

(71) Applicant: TOYOTA JIDOSHA KABUSHIKI KAISHA, Toyota-shi, Aichi-ken (JP)

(72) Inventors: Kazuki Sugie, Miyoshi (JP); Masanobu Ohmi, Kasugai (JP); Seiji Yamamoto, Seto (JP); Yoshiaki Matsumura, Toyota (JP); Kosuke Sakakibara, Toyota (JP); Misato Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 15/427,671

(22) Filed: Feb. 8, 2017

(65) Prior Publication Data
US 2017/0282834 A1    Oct. 5, 2017

(30) Foreign Application Priority Data
Apr. 4, 2016    (JP) .................. 2016-075386

(51) Int. Cl.
| | | |
|---|---|---|
| *B60R 21/207* | (2006.01) | |
| *B60R 21/231* | (2011.01) | |
| *B60R 21/015* | (2006.01) | |
| *B60R 21/013* | (2006.01) | |
| *B60R 21/233* | (2006.01) | |

(Continued)

(52) U.S. Cl.
CPC .......... *B60R 21/207* (2013.01); *B60R 21/013* (2013.01); *B60R 21/01512* (2014.10);
(Continued)

(58) Field of Classification Search
CPC ............. B60R 21/207; B60R 21/233; B60R 21/01512; B60R 21/01548; B60R 21/231; B60R 2021/0048; B60R 2021/01034; B60R 2021/2074; B60R 2021/01317; B60R 2021/01315; B60R 2021/23308; B60R 2021/23146; B60R 2021/01286; B60R 2022/4685; B60R 2022/4858; B60R 22/26
(Continued)

(56) References Cited

U.S. PATENT DOCUMENTS

| | | | |
|---|---|---|---|
| 3,953,049 A | 4/1976 | Surace et al. | |
| 5,611,604 A | 3/1997 | Thomas et al. | |

(Continued)

FOREIGN PATENT DOCUMENTS

| | | | |
|---|---|---|---|
| CN | 104129355 A | 11/2014 | |
| DE | 9202725 U1 * | 8/1992 | ....... B60R 21/23138 |

(Continued)

*Primary Examiner* — Keith J Frisby
(74) *Attorney, Agent, or Firm* — Oliff PLC

(57) ABSTRACT

An occupant protection apparatus includes: an airbag configured to be stored in a head rest or a seat back of a vehicle seat, and the airbag being formed as a single bag that is configured to cover a head of an occupant and including a front inflating part and a right and left pair of lateral inflating parts; a three-point seat belt device including webbing equipped with a lap belt and a shoulder belt, and a belt take-up mechanism, and the belt take-up mechanism applying tension to the webbing; and a control unit that, in the event that an impact to the vehicle has been predicted or detected, activates the belt take-up mechanism before inflating and deploying the airbag.

5 Claims, 12 Drawing Sheets

(51) Int. Cl.
    *B60R 21/01*         (2006.01)
    *B60R 22/46*         (2006.01)
    *B60R 21/00*         (2006.01)

(52) U.S. Cl.
    CPC ...... B60R 21/01548 (2014.10); B60R 21/231 (2013.01); B60R 21/233 (2013.01); *B60R 2021/0048* (2013.01); *B60R 2021/01034* (2013.01); *B60R 2021/2074* (2013.01); *B60R 2022/4685* (2013.01)

(58) Field of Classification Search
    USPC .................. 280/729, 730.1, 743.1, 733, 806; 297/480
    See application file for complete search history.

(56) References Cited

U.S. PATENT DOCUMENTS

| | | | |
|---|---|---|---|
| 6,637,772 B1* | 10/2003 | Fagerhag | B60R 22/46 280/806 |
| 9,573,553 B2* | 2/2017 | Ko | B60R 21/233 |
| 2002/0008372 A1* | 1/2002 | Bacher | B60R 22/28 280/735 |
| 2013/0015642 A1 | 1/2013 | Islam et al. | |
| 2014/0327234 A1 | 11/2014 | Heurlin et al. | |
| 2016/0167613 A1* | 6/2016 | Farooq | B60R 21/231 280/730.1 |

FOREIGN PATENT DOCUMENTS

| | | |
|---|---|---|
| DE | 19834061 A1 | 2/2000 |
| EP | 1698521 A1 | 9/2006 |
| EP | 2799291 A1 | 11/2014 |
| JP | 2000-513291 A | 10/2000 |
| JP | 2000-344044 A | 12/2000 |
| JP | 2001-270363 A | 10/2001 |
| JP | 2009-096233 A | 5/2009 |
| JP | 2010-143358 A | 7/2010 |
| JP | 2013-018378 A | 1/2013 |

* cited by examiner

OCCUPANT PROTECTION APPARATUS

CROSS-REFERENCE TO RELATED APPLICATION

This application claims priority under 35 U.S.C. 119 from Japanese Patent Application No. 2016-075386 filed on Apr. 4, 2016, the disclosure of which is incorporated by reference herein in its entirety.

BACKGROUND

Technical Field

Preferred embodiments relate to an occupant protection apparatus.

Related Art

Japanese Patent Application Publication (JP-A) No. 2000-344044 discloses an airbag device which, at the time of a crash, supplies gas from an inflator, through a gas supply pipe, to a bag attached to the gas supply pipe secured to a seat back, to thereby inflate the bag so as to cover the front and the sides of an occupant. Furthermore, JP-A No. 2013-018378 discloses an airbag device where a pair of airbags inflate forward from right and left end portions of a head rest of a seat and become joined to each other in front of the head of an occupant, while a secondary airbag inflates forward from a central portion of the head rest and becomes joined to the pair of airbags.

Moreover, U.S. Patent Application Publication No. 2013/0015642 discloses a structure where a hood is stored inside a cover disposed in the upper portion of a seat back, and the hood receives a supply of gas from an inflator and becomes deployed to thereby cover the upper body of an occupant.

SUMMARY

In the configuration disclosed in JP-A No. 2000-344044, visual attractiveness is poor because the gas supply pipe is disposed on top of the seat back. Likewise, in the configuration disclosed in U.S. Patent Application Publication No. 2013/0015642, visual attractiveness is also poor because the inflator and the cover are exposed. Meanwhile, in the configuration disclosed in JP-A No. 2013-018378, it is difficult to ensure joint strength between the pair of head airbags that become joined to each other after inflation and deployment and joint strength of the secondary head airbag with respect to the pair of head airbags.

In order to address these issues, it is conceivable to employ a configuration where an airbag is stored in a head rest or a seat back of a vehicle seat, with the airbag becoming inflated and deployed so as to cover the head of an occupant from the seat front side and both the right and left sides. Here, if, at the time of the inflation and deployment of the airbag, the head of the occupant is far outside the range of protection of the airbag, as the upper body of the occupant is away from the seat back, for example, there is the potential for the airbag as it is being inflated and deployed to interfere with the head of the occupant.

In consideration of the above circumstances, it is an object of preferred embodiments to provide an occupant protection apparatus which, in a configuration where an airbag is stored in a head rest or a seat back, can prevent the airbag, as it is being inflated and deployed, from interfering with the head of the occupant.

An occupant protection apparatus of a first aspect of the disclosure includes an airbag, a three-point seat belt device, and a control unit. The airbag is configured to be stored in a head rest or a seat back of a vehicle seat and is inflated and deployed by a supply of gas. The airbag is formed as a single bag that covers a head of an occupant and includes a front inflating part, which is inflated at a seat front side of the head, and a right and left pair of lateral inflating parts, which are connected to the front inflating part and are inflated at seat lateral sides of the head. The three-point seat belt device includes webbing, which is equipped with a lap belt and a shoulder belt, and a belt take-up mechanism. The lap belt restrains a pelvic region of the occupant and the shoulder belt restrains an upper body of the occupant, and the belt take-up mechanism applies tension to the webbing. The control unit that, in the event that an impact to the vehicle has been predicted or detected, activates the belt take-up mechanism before inflating and deploying the airbag.

In the occupant protection apparatus pertaining to the first aspect, the airbag is stored in the head rest or the seat back of the vehicle seat. Additionally, the airbag is inflated and deployed from the head rest or the seat back by a supply of gas. Furthermore, the airbag is formed as a single bag that includes the front inflating part and the right and left pair of lateral inflating parts, and covers the head of the occupant, so the airbag restricts movement of the occupant (restrains the occupant) with respect to various types of crashes and protects the occupant.

Furthermore, the belt take-up mechanism that applies tension to the webbing is disposed in the three-point seat belt device, and, in the event that an impact to the vehicle has been predicted or detected, the control unit activates the belt take-up mechanism before inflating and deploying the airbag. Because of this, the airbag inflates and deploys in a state in which tension has been applied to the webbing and the upper body of the occupant is moved toward the seat back, and the head of the occupant can be prevented from being far outside a range of protection of the airbag as the airbag is being inflated and deployed. In particular, in a configuration that protects the occupant using an airbag formed as a single bag and covering the head of the occupant like in the present disclosure, the position of the head of the occupant at the time of the inflation and deployment of the airbag greatly affects protection performance. For this reason, by employing a configuration that activates the belt take-up mechanism before inflating and deploying the airbag, the head of the occupant can be positioned in a fixed range at the time of the inflation and deployment of the airbag, and the airbag as it is being inflated and deployed can be prevented from interfering with the head of the occupant.

An occupant protection apparatus of a second aspect of the disclosure includes the first aspect, wherein the airbag is inflated and deployed after a predetermined amount of the shoulder belt has been taken up by the belt take-up mechanism.

In the occupant protection apparatus of the second aspect, even in a case in which the upper body of the occupant is away from the seat back before the activation of the belt take-up mechanism, by taking up the predetermined amount of the shoulder belt the upper body of the occupant can be moved toward the seat back before the inflation and deployment of airbag.

An occupant protection apparatus of a third aspect of the disclosure includes the first or second aspect, and further includes a tension relaxing mechanism which, when the tension acting on the shoulder belt after the inflation and deployment of the airbag becomes equal to or greater than a predetermined value, relaxes the tension.

In the occupant protection apparatus of the third aspect, discomfort of the occupant caused by tightening the shoulder belt can be reduced by using the tension relaxing mechanism to relax the tension in the shoulder belt. Furthermore, even in a case in which the tension in the shoulder belt has been relaxed, the upper body of the occupant is supported by both the shoulder belt and the airbag, and so the ability to protect the occupant can be ensured.

An occupant protection apparatus of a fourth aspect of the disclosure includes any one of the first to third aspects, and further includes a build detection sensor that detects a build of the occupant seated in the vehicle seat, wherein, in a case in which the build of the occupant detected by the build detection sensor is larger than a predetermined value, the control unit activates the belt take-up mechanism at an earlier stage than in a case in which the build of the occupant is not larger than the predetermined value.

In the occupant protection apparatus of the fourth aspect, the build detection sensor detects the build of the occupant, and, in a case in which the build of the occupant is larger than the predetermined value, the control unit activates the belt take-up mechanism at an early stage to apply tension to the webbing. Usually, more time is needed to restrain an occupant with a relatively large build against the seat back than an occupant with a relatively small build after tension is applied to the webbing. For this reason, by activating the belt take-up mechanism at an early stage, it can be made easier to move the head of even an occupant with a relatively large build to the range of protection of the airbag by the time the airbag inflates and deploys.

An occupant protection apparatus of a fifth aspect of the disclosure includes any one of the first to fourth aspects, wherein the front inflating part is equipped with portions that inflate at the seat front side of shoulders of the occupant, with one portion being positioned at one side in a seat width direction where the occupant is restrained by the shoulder belt and with another portion being positioned at the other side in the seat width direction, and the other portion is inflated and deployed to a position closer to a shoulders of the occupant than the one portion.

In the occupant protection apparatus of the fifth aspect, the other portion of the front inflating part that inflates at the seat front side of the shoulder, the shoulder is positioned at the other side (the opposite side to the restraining side) in the seat width direction and is not restrained by the shoulder belt, becomes inflated and deployed to a position close to the shoulder. Because of this, the shoulder that is positioned at the one side in the seat width direction is restrained by the shoulder belt, and the shoulder that is positioned at the opposite side to the restraining side and that is not restrained by the shoulder belt is restrained by the other portion of the front inflating part, and so the restrained state of the occupant can be well maintained.

An occupant protection apparatus of a sixth aspect of the disclosure includes the fifth aspects, wherein, among the portions of the front inflating part that inflate at the seat front side of the shoulders of the occupant, the other portion at the other side in the seat width direction has a larger capacity than the one portion at the one side in the seat width direction.

In the occupant protection apparatus of the sixth aspect, among the portions of the front inflating part that inflate at the seat front side of the shoulders of the occupant, the other portion positioned at the other side in the seat width direction becomes inflated and deployed to a larger extent than the one portion positioned at the one side in the seat width direction. Because of this, the ability to restrain the shoulder, that is positioned on the other side (the opposite side to the restraining side) in the seat width direction and that is not restrained by the shoulder belt, can be improved.

An occupant protection apparatus of a seventh aspect of the disclosure includes the fifth aspect or the sixth aspects, wherein, among the right and left pair of lateral inflating parts, a lateral inflating part positioned at the other side in the seat width direction becomes inflated and deployed at an earlier stage than a lateral inflating part positioned at the one side in the seat width direction where the occupant is restrained by the shoulder belt.

In the occupant protection apparatus of the seventh aspect, by inflating and deploying at an early stage the lateral inflating part positioned at the other side in the seat width direction, the shoulder that is positioned at the opposite side to the restraining side and that is not restrained by the shoulder belt can be restrained at an early stage.

An occupant protection apparatus of an eighth aspect of the disclosure includes the seventh aspect, wherein the cross-sectional area of a gas flow path, through which the gas flows into the lateral inflating part positioned at the other side in the seat width direction, is larger than the cross-sectional area of another gas flow path, through which the gas flows into the lateral inflating part positioned at the one side in the seat width direction.

In the occupant protection apparatus of the eighth aspect, the gas can be supplied first to the lateral inflating part positioned at the other side in the seat width direction by means of a simple configuration. It should be noted that "cross-sectional area" here means the cross-sectional area of the space through which the gas flows.

An occupant protection apparatus of a ninth aspect of the disclosure includes any one of the first to eighth aspects, wherein the lateral inflating parts become inflated as a result of the gas being supplied thereto via the front inflating part.

In the occupant protection apparatus of the ninth aspect, the gas is supplied to the front inflating part before it is supplied to the lateral inflating parts, so the front inflating part inflates first and the lateral inflating parts inflate thereafter. By inflating the airbag in stages in this way, the airbag as it is being inflated and deployed can be effectively prevented from interfering with the head of the occupant, and in the inflated and deployed state the front inflating part and the lateral inflating parts can be brought closer to the head of the occupant to ensure restraining ability. In particular, at the time of a crash such as a frontal crash in a case in which the vehicle seat is facing the vehicle forward direction, inertial movement of the occupant in the vehicle forward direction can be restricted as a result of the front inflating part inflating first, and the head of the occupant can be restrained from both the right and left sides as a result of the lateral inflating parts being inflated thereafter.

An occupant protection apparatus of a tenth aspect of the disclosure includes any one of the first to ninth aspects, wherein lowers ends of the lateral inflating parts are adapted to contact, in the inflated and deployed state, shoulders of the occupant.

In the occupant protection apparatus of the tenth aspect, the airbag can be positioned in the vertical direction relative to the occupant as a result of the lower ends of the lateral inflating parts contacting the tops of the shoulders of the occupant.

An occupant protection apparatus of an eleventh aspect of the disclosure includes any one of the first to tenth aspects, wherein the seat belt device including the belt take-up mechanism is configured to be mounted in the vehicle seat.

In the occupant protection apparatus of the eleventh aspect, tension can be applied to the webbing by the belt take-up mechanism regardless of the direction the vehicle seat faces.

An occupant protection apparatus of a twelfth aspect of the disclosure includes the eleventh aspect, wherein the belt take-up mechanism is configured to be disposed inside the seat back at one side in a seat width direction where the occupant is restrained by the shoulder belt, and an inflator that supplies the gas to the airbag is configured to be disposed inside the seat back at the other side in the seat width direction.

In the occupant protection apparatus of the twelfth aspect, by placing the belt take-up mechanism inside the seat back at the one side (the restraining side) in the seat width direction, tension can be applied directly to the shoulder belt. Furthermore, by placing the inflator at the other side in the seat width direction on the opposite side of where the belt take-up device is placed, space for placing the inflator can be ensured without having to increase the size of the seat back.

As described above, according to the occupant protection apparatus of the first aspect of the disclosure, the occupant protection apparatus achieves the superior effect that, in a configuration where an airbag is stored in a head rest or a seat back, prevents the airbag as it is being inflated and deployed from interfering with the head of the occupant.

According to the occupant protection apparatus of the second aspect, the occupant protection apparatus achieves the superior effect that effectively prevents the airbag as it is being inflated and deployed from interfering with the head of the occupant compared to a configuration where the airbag is inflated and deployed right after the belt take-up mechanism has been activated.

According to the occupant protection apparatus of the third aspect, the occupant protection apparatus achieves the superior effect that reduces discomfort of the occupant while ensuring restraining ability.

According to the occupant protection apparatus of the fourth aspect, the occupant protection apparatus achieves the superior effect that ensures the restraining ability of the occupant protection apparatus regardless of the build of the occupant.

According to the occupant protection apparatus of the fifth aspect, the occupant protection apparatus achieves the superior effect that effectively restrains both shoulders of the occupant.

According to the occupant protection apparatus of the sixth aspect, the occupant protection apparatus achieves the superior effect that, compared to a configuration where the right and left inflating portions of the front inflating part that inflate at the seat front side of the shoulders of the occupant have the same capacities, improves the ability to restrain the shoulder that is positioned at the opposite side to the restraining side and that is not restrained by the shoulder belt.

According to the occupant protection apparatus of the seventh aspect, the occupant protection apparatus achieves the superior effect that effectively prevents a part of the upper body of the occupant at the opposite side to the restraining side from moving due to inertia at the time of an impact to the vehicle or when the vehicle suddenly brakes.

According to the occupant protection apparatus of the eighth aspect, the occupant protection apparatus achieves the superior effect that inflates and deploys at an early stage, by means of a simple configuration, the lateral inflating part at the opposite side to the restraining side.

According to the occupant protection apparatus of the ninth aspect, the occupant protection apparatus achieves the superior effect that, compared to a configuration where the front inflating part and the lateral inflating parts become inflated and deployed at the same time, improves restraining ability while prevents the airbag as it is being inflated and deployed from interfering with the head of the occupant.

According to the occupant protection apparatus of the tenth aspect, the occupant protection apparatus achieves the superior effect that inflates and deploys the airbag in an appropriate position in the vertical direction regardless of individual differences in the build and sitting posture of the occupant.

According to the occupant protection apparatus of the eleventh aspect, the occupant protection apparatus achieves the superior effect that prevents the airbag as it is being inflated and deployed from interfering with the head of the occupant regardless of the direction the vehicle seat faces.

According to the occupant protection apparatus of the twelfth aspect, the occupant protection apparatus achieves the superior effect that the belt take-up device and the inflator can be placed inside the seat back without having to increase the size of the seat back.

BRIEF DESCRIPTION OF THE DRAWINGS

Preferred embodiments will be described in detail based on the following figures, wherein.

DETAILED DESCRIPTION

<First Embodiment>

Figure 1:
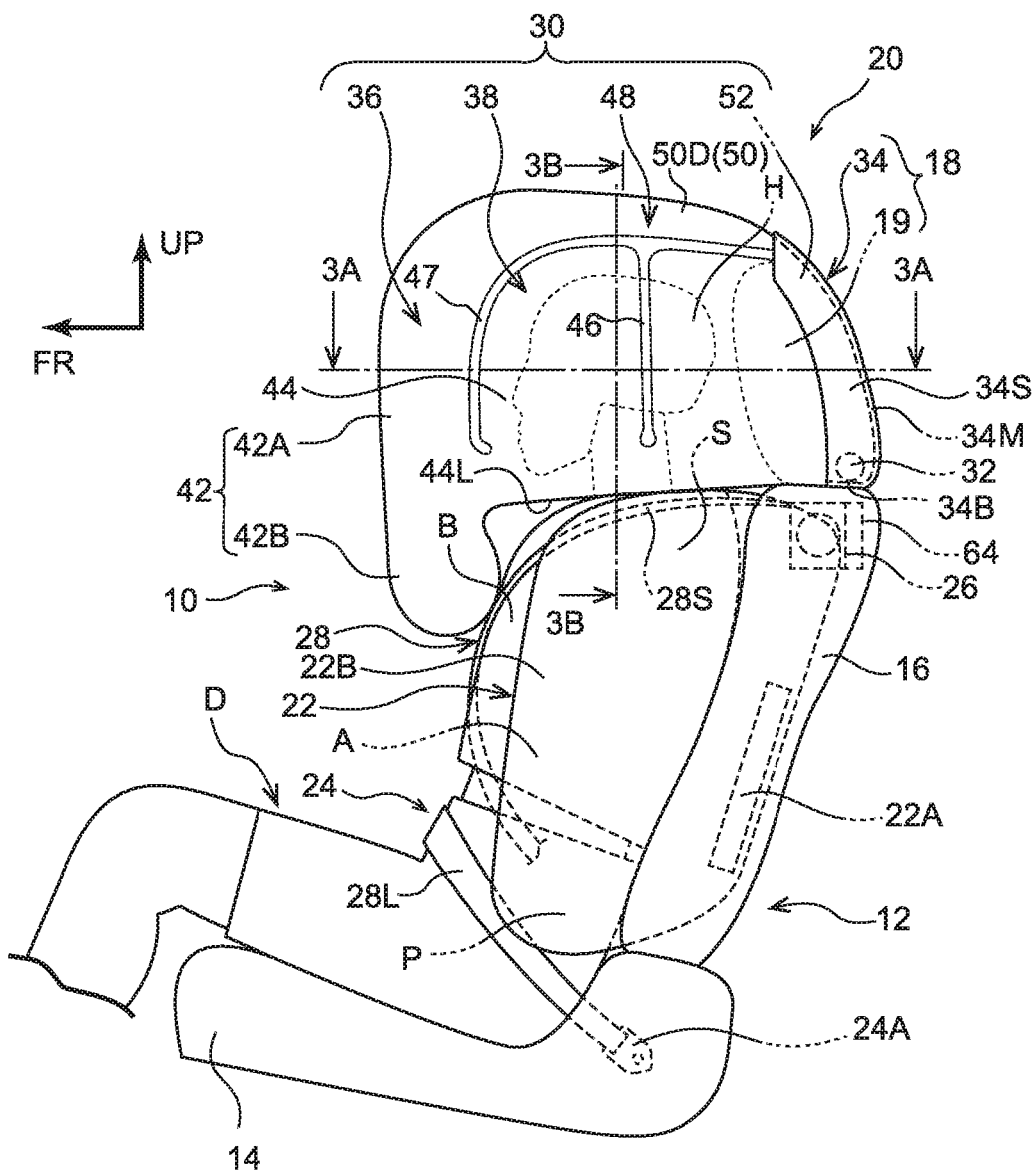
FIG. 1 is a side view schematically showing the protection of a seated occupant by an occupant protection apparatus pertaining to a first embodiment.

An occupant protection apparatus 10 pertaining to a first embodiment of the present invention will now be described with reference to the drawings. It should be noted that arrow FR and arrow UP appropriately shown in the drawings indicate a forward direction (the direction a seated occupant faces) and an upward direction, respectively, of a vehicle seat 12. When description is given below simply using the directions of front/rear, upper/lower, and right/left, unless otherwise specified these will be understood to mean front/rear in the seat forward and rearward direction, upper/lower in the seat vertical direction, and right/left when facing the forward direction in the seat forward and rearward direction. Furthermore, arrow IN appropriately shown in the drawings indicates a central side in the vehicle width direction of the vehicle in which the vehicle seat 12 is installed.

(Overall Schematic Configuration of Occupant Protection Apparatus)

Figure 2:
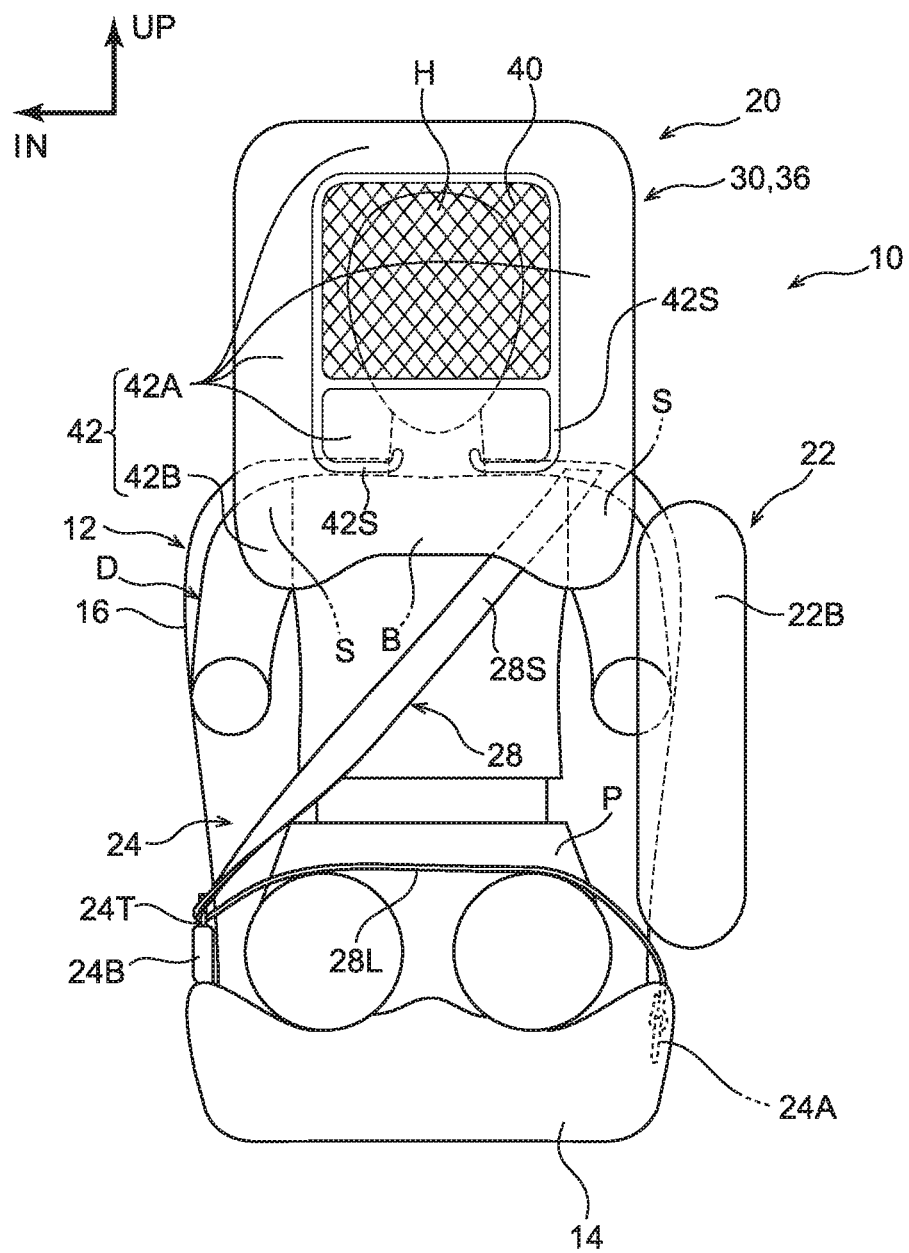
FIG. 2 is a front view schematically showing the protection of the seated occupant by the occupant protection apparatus pertaining to the first embodiment.

As shown in FIG. 1 and FIG. 2, the occupant protection apparatus 10 of the present embodiment is installed in a vehicle seat 12. The vehicle seat 12 is placed offset to either the right or left side (the left side in the present embodiment) of a vehicle width direction center of a body of an automobile not shown in the drawings. In the present embodiment, the seat forward and rearward direction of the vehicle seat 12 coincides with a forward and rearward direction of the vehicle, and the seat width direction of the vehicle seat 12 coincides with a vehicle width direction. Furthermore, the vehicle seat 12 is configured to include a seat cushion 14, a seat back 16 whose lower end is connected to a rear end of the seat cushion 14, and a head rest 18 disposed on an upper end of the seat back 16.

It should be noted that the drawings show a state in which a crash test dummy D, serving as a model of an occupant to be protected, is seated on the seat cushion 14 of the vehicle seat 12. The dummy D is, for example, World Side Impact Dummy (WorldSID) AM50 (representing a 50th percentile American adult male). The dummy D is seated in a standard sitting posture determined by crash test procedures, and the vehicle seat 12 is positioned in a standard set position corresponding to the sitting posture. Below, in order to facilitate understanding of the description, the dummy D will be called "the seated occupant D."

The occupant protection apparatus 10 is configured to include a multidirectional airbag device 20 for protecting the seated occupant D from various types of crashes, a side airbag device 22, a seat belt device 24, and an electronic control unit (ECU) 60 serving as a control unit. Below, the schematic configurations of the seat belt device 24, the side airbag device 22, and the multidirectional airbag device 20 will be described and then control by the ECU 60 will be described.

The seat belt device 24 is a three-point seat belt device and includes a belt (webbing) 28. One end of the belt 28 is taken up by a retractor 26 in such a way that the belt 28 can be pulled out from the retractor 26, and the other end of the belt 28 is anchored to an anchor 24A. A tongue plate 24T is slidably disposed on the belt 28, and the seated occupant D puts on the belt 28 by causing the tongue plate 24T to engage with a buckle 24B. Additionally, the belt 28 is configured to include a shoulder belt 28S and a lap belt 28L. In a state in which the seated occupant D is wearing the belt 28, the shoulder belt 28S extends from the retractor 26 to the tongue plate 24T and restrains the upper body of the seated occupant D, and the lap belt 28L extends from the tongue plate 24T to the anchor 24A and restrains a pelvic region P of the seated occupant D.

In the present embodiment, the seat belt device 24 is an in-seat seat belt device where the retractor 26, the anchor 24A, and the buckle 24B are disposed in the vehicle seat 12. Furthermore, the retractor 26 is equipped with a pretensioner 64 serving as a belt take-up mechanism which, upon being activated, forcibly applies tension to the belt 28. The pretensioner 64 is activated by the later-described ECU 60. Moreover, a belt winding amount detection sensor 66 that detects the winding amount of the belt 28 is disposed in the retractor 26 (see FIG. 7).

Figure 7:
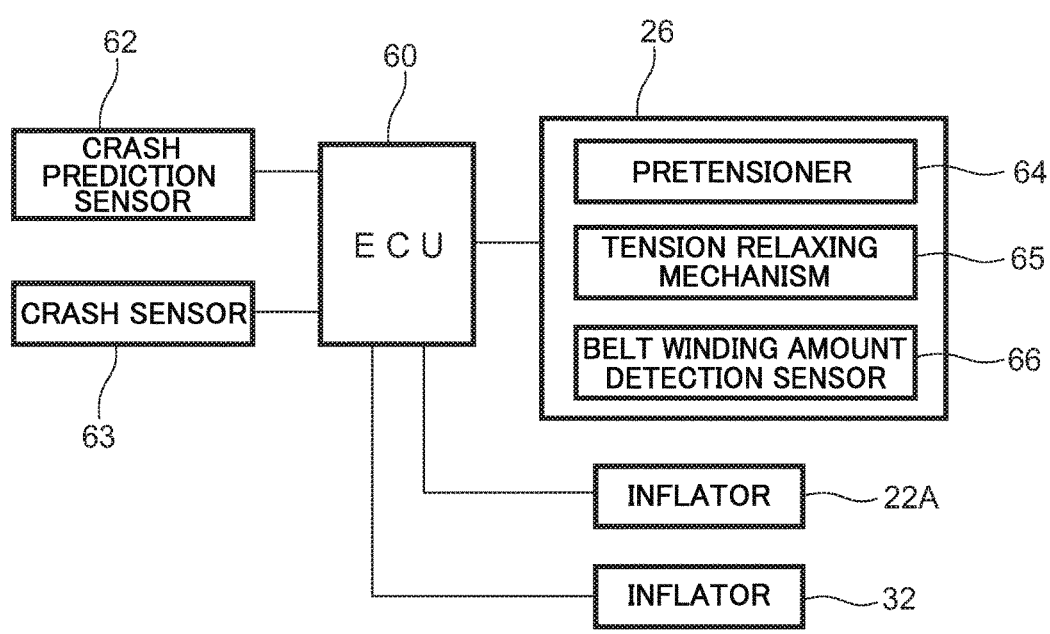
FIG. 7 is a block diagram showing an example of the occupant protection apparatus pertaining to the first embodiment.

Furthermore, a tension relaxing mechanism 65 that relaxes the tension acting on the belt 28 is disposed in the retractor 26 (see FIG. 7). It should be noted that, as an example of the tension relaxing mechanism 65, there can be used a mechanism where, when the tension acting on the belt 28 becomes equal to or greater than a predetermined value, a shaft that takes up the belt 28 becomes screwed to relax the tension acting on the belt 28. As another example of the tension relaxing mechanism 65, there may be used a mechanism where the belt 28 is folded over and sewn and, when the tension acting on the belt 28 becomes equal to or greater than the predetermined value, the sewn section comes undone to relax the tension.

The side airbag device 22 is configured to include an inflator 22A and a side airbag 22B. The side airbag device 22 is stored in a vehicle width direction outer side portion of the seat back 16 in a state in which the side airbag 22B is folded up. The inflator 22A, when activated, generates a gas inside the side airbag 22B. The side airbag 22B becomes inflated and deployed, by this gas, on a vehicle width direction outer side of the seated occupant D so that the side airbag 22B projects forward from a side portion of the seat back 16. In the present embodiment, the side airbag 22B inflates and deploys on the vehicle width direction outer side of the pelvic region P, an abdomen A, a breast B, and a shoulder S of the seated occupant D.

(Configuration of Multidirectional Airbag Device)

As shown in FIG. 1, the multidirectional airbag device 20 includes a multidirectional airbag 30 serving as an airbag, an inflator 32, and a module case 34 that configures the head rest 18. The multidirectional airbag 30 is folded up and stored inside the module case 34 in a state in which the inflator 32 is connected to the multidirectional airbag 30 so that the inflator 32 can supply the gas to the multidirectional airbag 30. The multidirectional airbag device 20 modularized in this way is disposed in the head rest 18 on top of the seat back 16. The multidirectional airbag device 20 will now be specifically described below.

(Multidirectional Airbag)

Figure 3A:
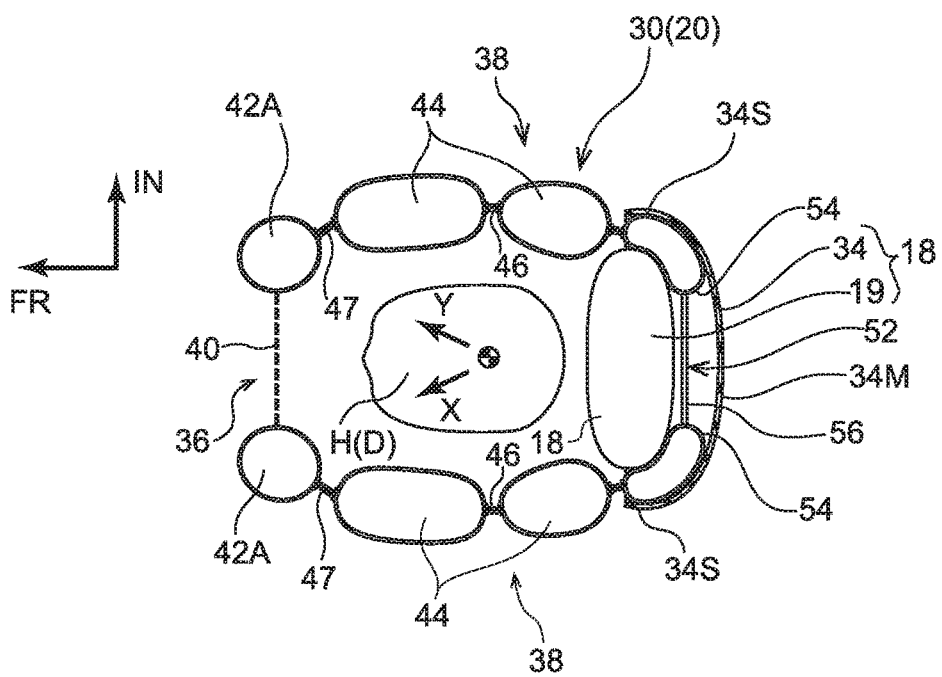
FIG. 3A is a sectional view along line 3A-3A of FIG. 1 and shows an inflated and deployed state of a multidirectional airbag configuring the occupant protection apparatus pertaining to the first embodiment.
Figure 3B:
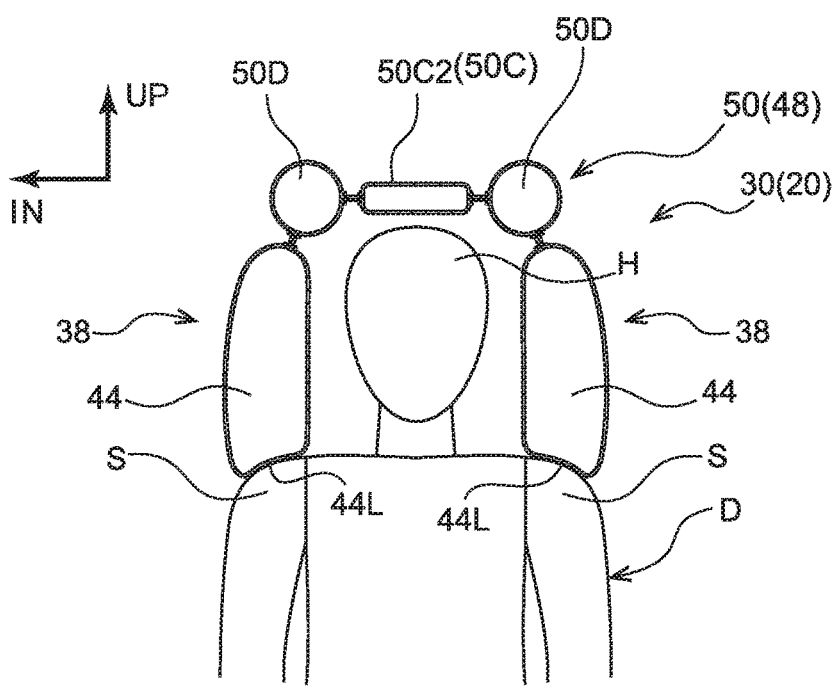
FIG. 3B is a sectional view along line 3B-3B of FIG. 1 and shows the inflated and deployed state of the multidirectional airbag configuring the occupant protection apparatus pertaining to the first embodiment.

As shown by way of a plan sectional view in FIG. 3A, the multidirectional airbag 30 is configured as a single bag that becomes inflated and deployed so as to cover a head H of the seated occupant D (hereinafter sometimes simply called "the head H") from the front and both the right and left sides. More specifically, as shown in FIG. 1 to FIG. 3A to FIG. 3B, the multidirectional airbag 30 includes a front deploying part 36, which becomes deployed in front of the head H, and a pair of lateral deploying parts 38, which become deployed on both the right and left sides of the head H.

The front deploying unit 36 includes a mesh part 40, which serves as a visible structure that becomes deployed directly in front of the head H, and a front inflating part 42, which becomes inflated and deployed surrounding the mesh part 40 as seen in a front view. The mesh part 40 has a substantially rectangular shape as seen in a front view, and the front inflating part 42 has a substantially rectangular frame shape whose inner peripheral edge is joined to the mesh part 40. The front inflating part 42 receives a supply of gas to become inflated and deployed.

As shown in FIG. 2, the section of the front inflating part 42 surrounding the mesh part 40 mainly on the upper side of the seat back 16 is a first inflating portion 42A that becomes inflated and deployed in front of the head H. Furthermore, the section of the front inflating part 42 positioned below the first inflating portion 42A (coinciding with the seat back 16 as seen in a front view) is a second inflating portion 42B that becomes inflated and deployed in front of the breast B and the shoulders S of the seated occupant D. The second inflating portion 42B is supplied with gas through the first inflating portion 42A. It should be noted that, in the present embodiment, the section of the first inflating portion 42A positioned below the mesh part 40 is sectioned off by a seam 42S from the other section of the first inflating portion 42A and is supplied with gas through the second inflating portion 42B.

As shown in FIG. 1, each of the lateral deploying unit 38 includes a lateral inflating part 44, which receives a supply of gas to become inflated and deployed on the side of the head H, and a seam portion 46, which serves as a non-inflating portion that extends along the vertical direction and sections the lateral inflating part 44 into front and rear sections. Each of the lateral inflating parts 44 has a size (area) that covers the entire head H as seen in a side view, and the seam portions 46 section the lateral inflating parts 44 into front and rear sections at locations of the lateral inflating parts 44 coinciding with the head H.

The front ends of the right and left lateral inflating parts 44 are connected in a communicated state to the lower end of the first inflating portion 42A of the front inflating part 42 (near the boundaries with the second inflating portion 42B). Because of this, the right and left lateral inflating parts 44 become inflated and deployed as a result of gas from the inflator 32 being supplied thereto via the front inflating part 42. The first inflating portion 42A and the lateral inflating parts 44 are partitioned from each other at sections above the communicated sections by seam portions 47 serving as non-inflating portions.

Lower ends 44L of the lateral inflating parts 44 of the right and left lateral deploying units 38 contact the tops of the shoulders S of the seated occupant D in the inflated and deployed state of the multidirectional airbag 30. The multidirectional airbag 30 in the inflated and deployed state becomes positioned in the vertical direction relative to (the head H of) the seated occupant D as a result of the lower ends 44L of the lateral inflating parts 44 contacting the shoulders S in this way.

In this positioned state, none of the front deploying unit 36, the right and left lateral deploying units 38, and a later-described upper deploying unit 48 of the multidirectional airbag 30 contact the head H of the seated occupant D in the normal sitting posture; rather, a space is formed between the head H and the front deploying unit 36, the right and left lateral deploying units 38, and the later-described upper deploying unit 48.

Furthermore, the multidirectional airbag 30 has an upper deploying unit 48 that interconnects the upper edges of the front deploying unit 36 and the right and left lateral deploying units 38 and becomes deployed above the head H of the seated occupant D. The upper deploying unit 48 includes mainly an upper inflating part 50 that receives a supply of gas to become inflated and deployed. The upper inflating part 50 includes a central inflating portion 50C, which becomes inflated and deployed above the head H, and a pair of upper duct portions 50D, which serve as duct portions and extend along the forward and rearward direction on the right and left sides of the central inflating portion 50C.

Figure 6:
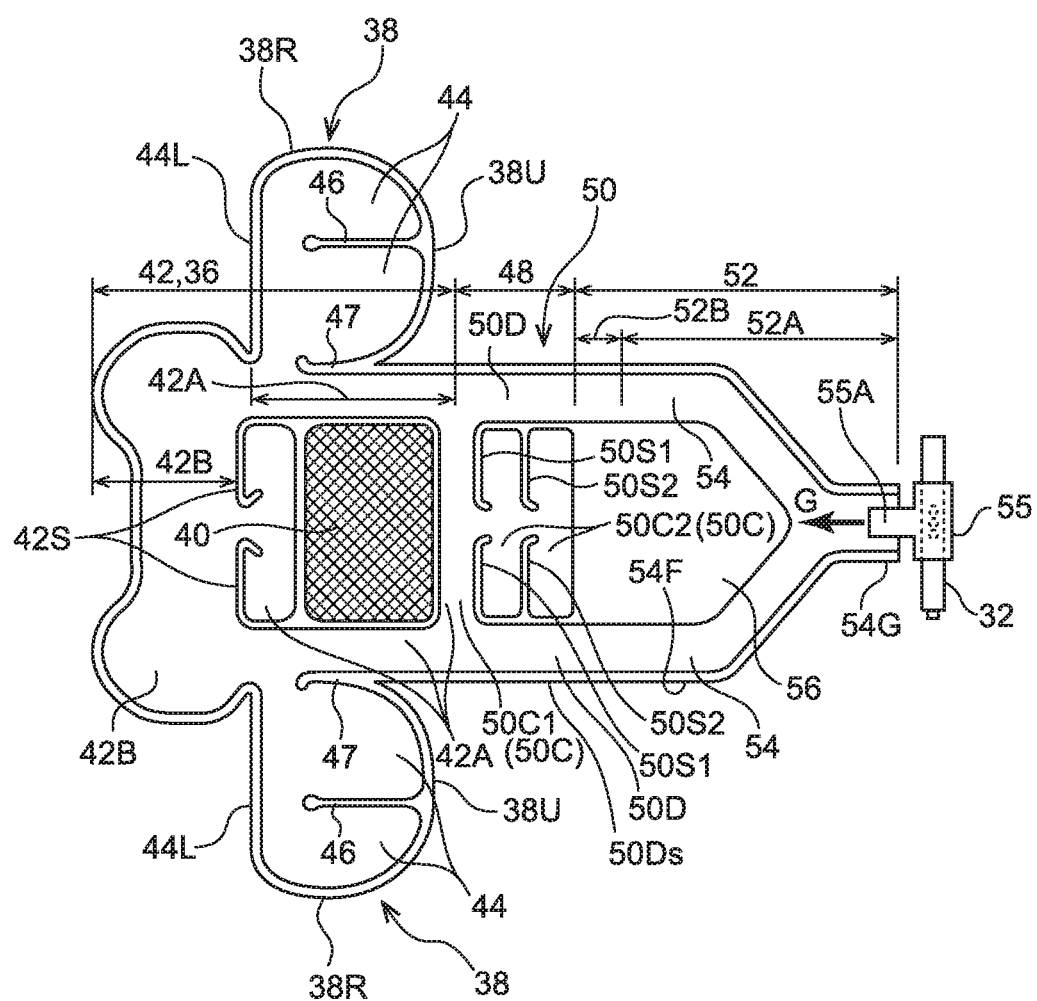
FIG. 6 is a drawing showing a flat pattern of the multidirectional airbag configuring the occupant protection apparatus pertaining to the first embodiment.

As shown in the flat pattern of FIG. 6, the central inflating portion 50C includes an inflating portion 50C1, which forms the upper edge of the front inflating part 42, and an inflating portion 50C2, which is sectioned off by a seam portion 50S1 from the inflating portion 50C1. The inflating portion 50C2 is sectioned into front and rear sections by a seam portion 50S2. Both the right and left ends of the inflating portion 50C 1 are communicated with the upper duct portions 50D, and the seat width direction central portion of the rear edge of the inflating portion 50C1 is communicated with the inflating portion 50C2. The front ends of the right and left upper duct portions 50D are communicated with both the right and left side edges of the upper end of the front inflating part 42.

The multidirectional airbag 30 has a rear deploying unit 52 that becomes deployed at back of the upper deploying unit 48. The rear deploying unit 52 includes rear duct parts 54, which are inflating portions, and a non-inflating part 56. The rear duct parts 54 are separated into right and left rear duct portions, and their upper ends are connected in a communicated state to the corresponding upper duct portions 50D on the right and left sides. The right and left rear duct parts 54 are joined to the rear edge of the central inflating portion 50C, and the front edges of the right and left rear duct parts 54 are connected to each other by the non-inflating part 56.

Furthermore, the right and left rear duct parts 54 merge with each other on the lower side of the non-inflating part 56 (the right side in FIG. 6) to form a gas introducing portion 54G. Additionally, the gas introducing portion 54G is connected in such a way that the gas from the inflator 32 can be supplied thereto via a T-shaped diffuser 55 (see arrow G). It should be noted that the multidirectional airbag device 20 is not limited to a configuration using the diffuser 55. For example, the inflator 32 may be stood upright, and the section of the inflator 32 including the gas discharge opening may be inserted into the gas introducing portion 54G. Furthermore, the gas introducing portion 54G may be configured to be bent in an L-shape, the inflator 32 may be laid on its side, and the section of the inflator 32 including the gas discharge opening may be inserted into the gas introducing portion 54G.

The rear deploying unit 52 described above can be divided into a base portion 52A, which becomes inflated and deployed in back of the head rest 18, and a connecting portion 52B, which becomes inflated and deployed above the head rest 18. The base portion 52A is supported at its lower end by the seat back 16 via the inflator 32 and the diffuser 55, and the connecting portion 52B interconnects in a communicated state the base portion 52A and the upper deploying unit 48.

Furthermore, as shown in FIG. 1, the multidirectional airbag 30 in the inflated and deployed state while in a non-restraining state in which the seated occupant D is not restrained, as seen in a side view, does not coincide with (overlap) the side airbag 22B, that is also in the inflated and deployed state while in a non-restraining state for the seated occupant D. In other words, the multidirectional airbag 30 and the side airbag 22B do not have inflated and deployed sections that overlap each other at least as seen in a side view, in their inflated and deployed states while in the non-restraining states. Furthermore, as shown in FIG. 2, in the inflated and deployed states while in the non-restraining states, the multidirectional airbag 30 does not, as also seen in a front view, coincide with the side airbag 22B.

The multidirectional airbag 30 that is inflated and deployed as described above has the flat shape (flat pattern) shown in FIG. 6 before it is folded up. The multidirectional airbag 30 having this flat shape is made as a single bag by one-piece-woven (OPW) technology. It should be noted that the multidirectional airbag 30 may also be made as a single bag by a method (cut and sew) where the peripheral edges of two textiles are sewn together.

(Inflator)

A combustible or cold gas inflator is employed for the inflator 32. The inflator 32 supplies, to the inside of the multidirectional airbag 30, the gas which is generated upon being activated. In the present embodiment, the inflator 32 is a cylindrical inflator and is placed with its longitudinal direction coinciding with the seat width direction inside the module case 34. The activation of the inflator 32 is controlled by the later-described ECU 60 serving as a control device.

(Module Case)

As shown in FIG. 1, the head rest 18 is configured to include a head rest body 19 and the module case 34, which is placed on the seat rear side of the head rest body 19. The head rest body 19 configures the front portion of the head rest 18 and is placed on the seat rear side of the head H of the seated occupant D.

Figure 5:
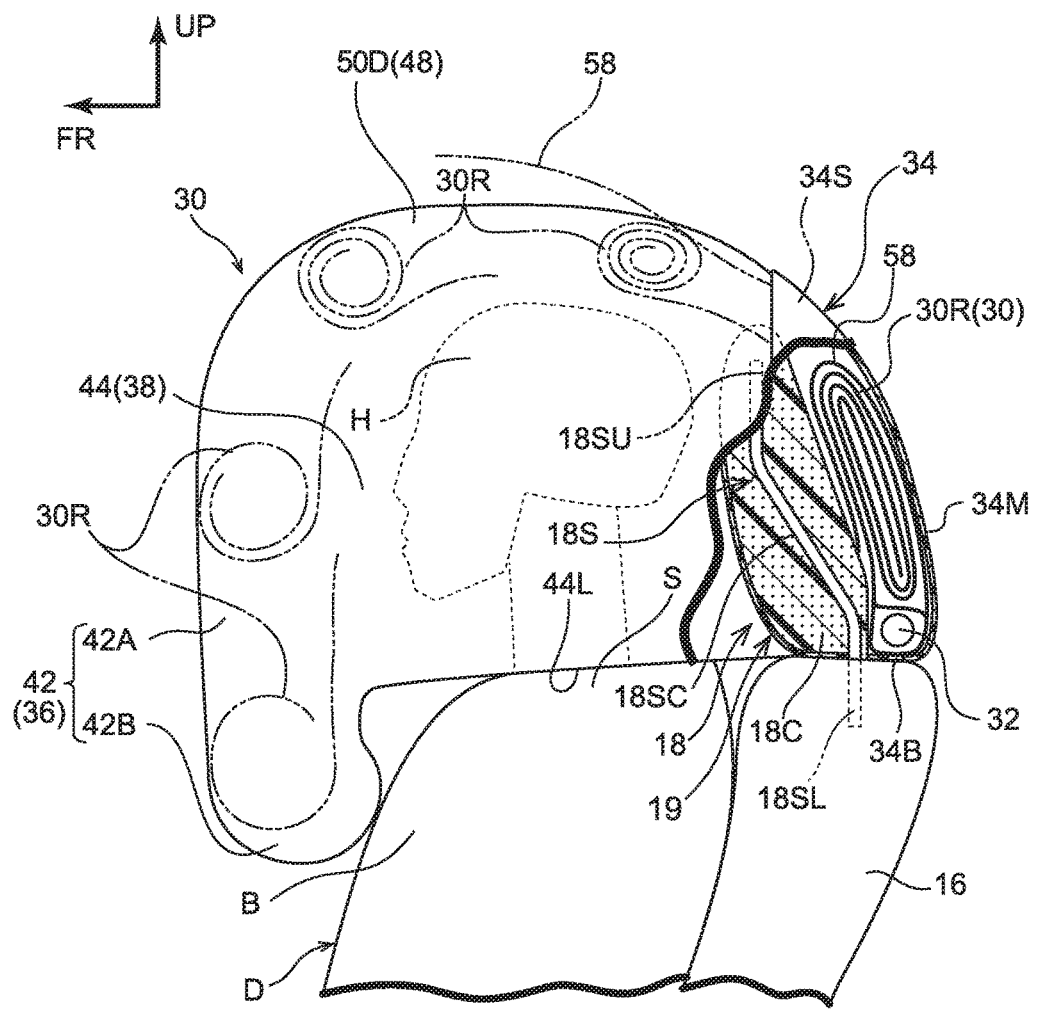
FIG. 5 is an enlarged partially cutaway schematic side view for describing the process of the inflation and deployment of the multidirectional airbag configuring the occupant protection apparatus pertaining to the first embodiment.

Furthermore, as shown in FIG. 5, the head rest body 19 is attached to the seat back 16 via a head rest stay 18S. The head rest stay 18S interconnects the head rest body 19 and the seat back 16 in the seat vertical direction, and an upper portion 18SU of the head rest stay 18S is positioned further in the forward direction than a lower portion 18SL of the head rest stay 18S supported in the seat back 16. Furthermore, the lower portion 18SL and the upper portion 18SU are interconnected by a sloping middle portion 18SC thereby forming the head rest stay 18S.

The module case 34, which is placed on the seat rear side of the head rest body 19, is a backboard configuring a design face of a rear portion of the head rest 18. Consequently, the multidirectional airbag 30 is stored in the rear portion of the head rest 18.

The module case 34 as seen in a front view projects upward beyond the upper end of the head rest body 19 and sticks out on both sides in the seat width direction in relation to the head rest body 19. That is, the module case 34 covers the head rest body 19 from the rear. In the present embodiment, the module case 34 covers the rear portion of the head rest body 19 from above and from both the right and left sides, and configures the design face of the rear portion of the head rest 18 as described above.

More specifically, the module case 34 includes mainly a base portion 34B, a main wall 34M serving as a rear wall, and a right and left pair of side walls 34S. The base portion 34B abuts the upper end of the seat back 16.

The main wall 34M extends upward from a rear end of the base portion 34B. The main wall 34M is forwardly tilted in such a way that its upper end is positioned further in the forward direction than its lower end, and the main wall 34M has a curved shape that becomes convex rearward and upward as seen in a side view. Furthermore, the main wall 34M as seen in a front view projects upward beyond the upper end of the head rest body 19 and sticks out on both sides in the seat width direction in relation to the head rest body 19.

A space for housing the multidirectional airbag 30 in the folded-up state is formed between the main wall 34M and the head rest body 19. Furthermore, the multidirectional airbag 30 as it is being inflated and deployed goes between the upper end portion of the main wall 34M and the head rest body 19. In the inflated and deployed state of the multidirectional airbag 30, the rear deploying unit 52 goes between the upper end portion of the main wall 34M and the head rest body 19.

The pair of side walls 34S extend forward from both seat width direction ends of the main wall 34M and cover the rear portion of the head rest body 19 as seen in a side view. Furthermore, as shown in FIG. 3A, in the inflated and deployed state of the multidirectional airbag 30, the lateral deploying units 38 (the sections near the boundaries with the rear deploying unit 52) go between the pair of side walls 34S and the head rest body 19.

The multidirectional airbag 30 in the folded-up state is stored between the module case 34 described above and the head rest body 19. Furthermore, the inflator 32 is fastened to a seat back frame by stud bolts together with the multidirectional airbag 30 and the base portion 34B of the module case 34.

The multidirectional airbag 30 is outer-roll-folded and stored inside the module case 34. "Outer roll folding" is a way of folding the airbag from its front end side into a roll facing upward and rearward so that the airbag is folded up reversely from the way it becomes deployed. In other words, "outer roll folding" is a way of folding where, as indicated by imaginary lines in FIG. 5, a roll-folded section 30R is positioned on the outer side (the opposite side of the head H side) as the multidirectional airbag 30 is being deployed. In the multidirectional airbag 30 having the lateral deploying units 38 sewn to the upper deploying unit 48 and the rear deploying unit 52 as described above, the lateral deploying units 38 are folded inside the roll at the stage when the front deploying unit 36 and the upper deploying unit 48 are outer-roll-folded.

Furthermore, a deployment guide cloth 58 is folded up together with the multidirectional airbag 30 and stored inside the module case 34. Additionally, the deployment guide cloth 58 is led outside the module case 34 in accompaniment with the inflation and deployment (unrolling) of the multidirectional airbag 30, and becomes deployed, between the multidirectional airbag 30 and a ceiling of the automobile in advance of the deployment of the multidirectional airbag 30. Furthermore, the coefficient of friction of the deployment guide cloth 58 with respect to the multidirectional airbag 30 is smaller than that with respect to the ceiling material of the automobile. In the present embodiment, the surface of the deployment guide cloth 58 on the cabin ceiling side is coated with silicone, and the surface of the deployment guide cloth 58 that contacts the multidirectional airbag 30 is a low-friction surface not coated with silicone.

Figure 4A:
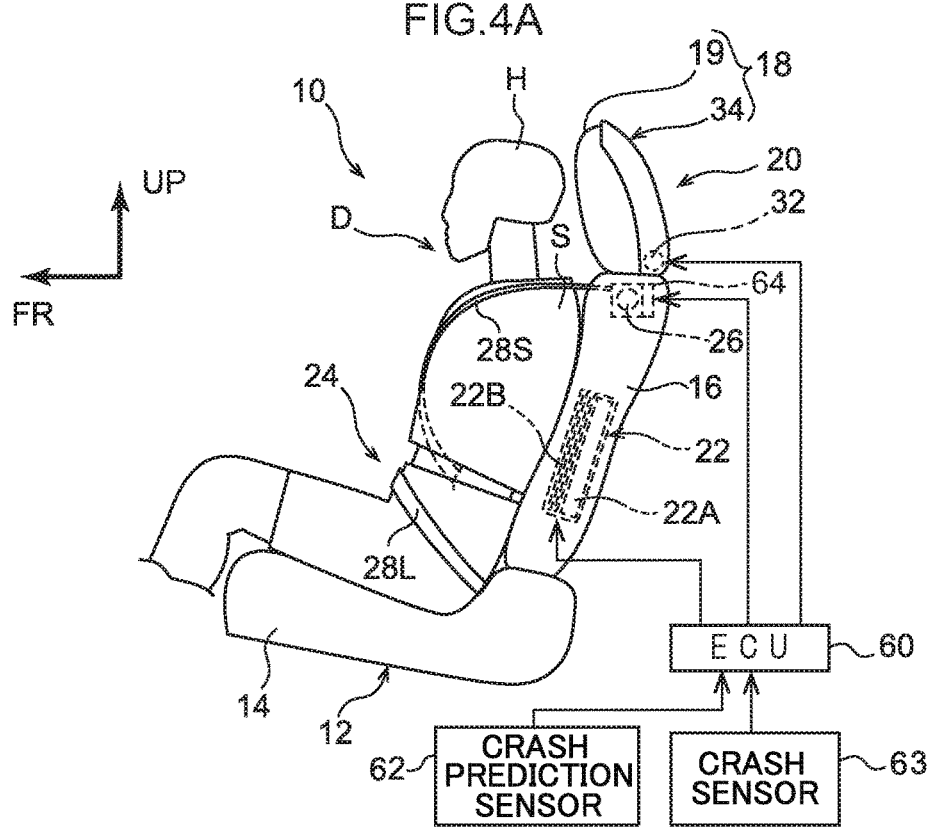
FIG. 4A is a side view showing the overall schematic configuration, before activation, of the occupant protection apparatus pertaining to the first embodiment.
Figure 4B:
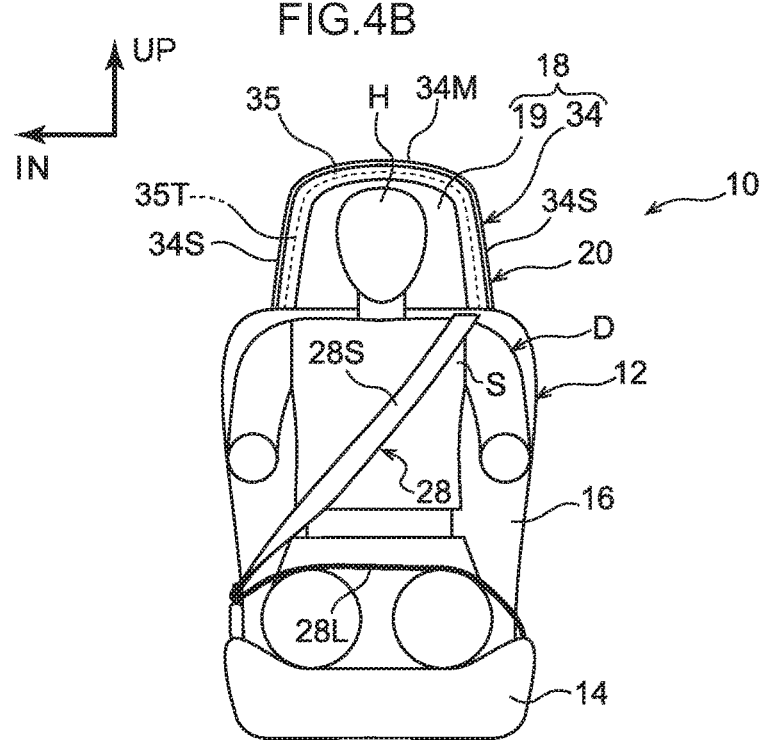
FIG. 4B is a front view showing the overall schematic configuration, before activation, of the occupant protection apparatus pertaining to the first embodiment.

As shown in FIG. 4B, the space between the module case 34 and the head rest body 19 is closed off by an airbag door 35. The airbag door 35 allows the forward inflation and deployment of the multidirectional airbag 30 as a result of the airbag door 35 being burst at a tear line 35T, which is a weak portion, by the deployment pressure of the multidirectional airbag 30.

(Configuration of ECU)

As shown in FIG. 4A, the multidirectional airbag device 20, the side airbag device 22, and the seat belt device 24 that configure the occupant protection apparatus 10 are controlled by the ECU 60 serving as a control device. Specifically, as shown in FIG. 7, the ECU 60 is electrically connected to the inflator 32 of the multidirectional airbag device 20 and the inflator 22A of the side airbag device 22. Furthermore, the ECU 60 is electrically connected to the retractor 26 of the seat belt device 24. Moreover, the ECU 60 is electrically connected to a crash prediction sensor 62 such as a pre-crash sensor and a crash sensor 63 (or sensor group).

The belt winding amount detection sensor 66 disposed in the retractor 26 is, for example, able to detect the take-up amount of the belt 28 by detecting the rotational amount of a spool that takes up the belt 28. Additionally, the winding amount of the belt 28 detected by the belt winding amount detection sensor 66 is transmitted to the ECU 60.

The ECU 60 can predict, for each type of crash described later, that various types of frontal impacts to the automobile are unavoidable on the basis of a signal from the crash prediction sensor 62. Furthermore, the ECU can predict that a side impact to the vehicle is unavoidable on the basis of a signal from the crash prediction sensor 62.

When a frontal crash has been predicted on the basis of a signal from the crash prediction sensor 62 or detected on the basis of a signal from the crash sensor 63, the ECU 60 activates the pretensioner 64 before inflating and deploying the multidirectional airbag 30. Because of this, tension is applied to the belt 28 to restrain the seated occupant D against the seat back 16. Thereafter, the ECU 60 activates the inflator 32. Because of this, the multidirectional airbag 30 becomes inflated and deployed in the seat forward direction. It should be noted that the types of frontal crashes in which the ECU 60 activates the inflator 32 are a full-overlap frontal crash and an offset frontal crash.

Furthermore, among the types of frontal crashes, when a frontal impact to a position offset a predetermined value or more to one side in the vehicle width direction has been predicted on the basis of the signal from the crash prediction sensor 62 or detected by the signal from the crash sensor 63, the ECU 60 activates the pretensioner 64 before inflating and deploying the multidirectional airbag 30 and the side airbag 22B. Because of this, tension is applied to the belt 28 to restrain the seated occupant D against the seat back 16. Thereafter, the ECU 60 activates the inflator 22A and the inflator 32. Because of this, the multidirectional airbag 30 becomes inflated and deployed in the seat forward direction and the side airbag 22B becomes inflated and deployed on the vehicle width direction outer side of the seated occupant D (see FIG. 2). The frontal impact to a position offset a predetermined value or more to one side in the vehicle width direction includes an oblique crash and a small overlap crash.

An oblique crash (MDB crash) is a crash from an oblique forward direction defined by the U.S. National Highway Traffic Safety Administration (NHTSA), for example, such as a crash where the relative angle with the crash partner is 15° and the amount of overlap in the vehicle width direction is about 35% as an example. In the present embodiment, as an example, an oblique crash at a relative velocity of 90 km/hr is envisioned. Furthermore, a small overlap crash is a type of car frontal crash where, for example, the amount of overlap in the vehicle width direction with the crash partner as defined by the U.S. Insurance Institute for Highway Safety (IIHS) is 25% or less. For example, a crash on the vehicle width direction outer side of a front side member that is a vehicle body skeleton corresponds to a small overlap crash. In the present embodiment, as an example, a small overlap crash at a relative velocity of 64 km/hr is envisioned.

Figure 8:
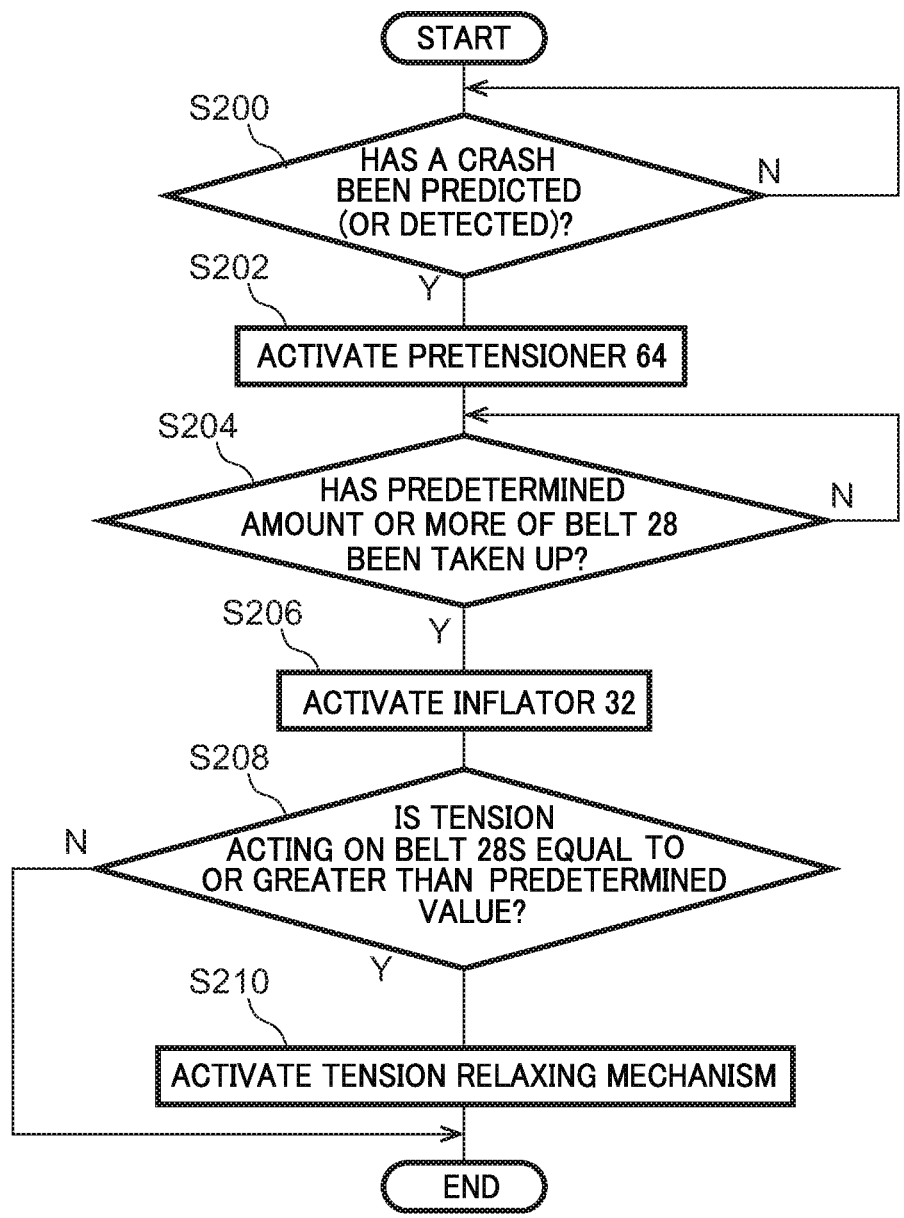
FIG. 8 is a flowchart showing an example of an activation sequence of the occupant protection apparatus pertaining to the first embodiment.

An activation sequence of the ECU 60 pertaining to the present embodiment will be described below using the flowchart of FIG. 8. It should be noted that the flowchart of FIG. 8 shows an activation sequence of the ECU 60 at the time of a frontal impact in which the side airbag 22B is not inflated and deployed.

First, in step S200, the ECU 60 determines whether or not a crash has been predicted or detected. Specifically, in a case in which a frontal impact has been predicted by the crash prediction sensor 62 or in a case in which a frontal impact has been detected by the crash sensor 63, the ECU 60 moves to step S202. If the determination is NO, then the ECU 60 repeatedly acquires the signals from the crash prediction sensor 62 and the crash sensor 63. It should be noted that, in the case of a vehicle not equipped with the crash prediction sensor 62, the ECU 60 acquires only the signal from the crash sensor 63 and determines only whether or not a crash has been detected.

In step S202, the ECU 60 activates the pretensioner 64 disposed in the retractor 26. Because of this, tension is forcibly applied to the belt 28 to move the seated occupant D toward the seat back 16 and restrain the seated occupant D.

Next, in step S204, the ECU 60 determines whether or not a predetermined amount or more of the belt 28 has been taken up. In the present embodiment, the ECU 60 determines whether or not the winding amount of the belt 28 detected by the belt winding amount detection sensor 66 (see FIG. 7) is greater than a preset amount. When the winding amount of the belt 28 detected by the belt winding amount detection sensor 66 becomes equal to or greater than the predetermined amount, the ECU 60 moves to step S206.

In step S206, the ECU 60 activates the inflator 32 of the multidirectional airbag device 20. Because of this, gas is supplied to the multidirectional airbag 30 so that the multidirectional airbag 30 becomes inflated and deployed. The front deploying unit 36 becomes deployed in front of the head H, the pair of lateral deploying units 38 become deployed on both the right and left sides of the head H, and the head H of the seated occupant D becomes covered from the front and both the right and left sides. In this way, the multidirectional airbag 30 becomes inflated and deployed after the predetermined amount of the belt 28 has been taken up by the pretensioner 64.

Next, in step S208, the ECU 60 determines whether or not the tension acting on the shoulder belt 28S is equal to or greater than a predetermined value. If the tension acting on the shoulder belt 28S is equal to or greater than the predetermined value, the ECU 60 moves to step S210. Furthermore, if the determination is NO, the ECU 60 ends the process.

In step S210, the ECU 60 activates the tension relaxing mechanism 65 (see FIG. 7) disposed in the retractor 26 to thereby relax the tension acting on the belt 28. The upper body of the seated occupant D is restrained by both the shoulder belt 28S and the multidirectional airbag 30. Then, the ECU 60 ends the process.

(Action and Effects)

Next, the action and effects of the present embodiment will be described.

In the present embodiment, the pretensioner 64 that applies tension to the belt 28 is disposed, and the pretensioner 64 is configured to be activated before the multidirectional airbag 30 is inflated and deployed. Because of this, the multidirectional airbag 30 becomes inflated and deployed in a state in which tension has been applied to the belt 28 to pull the upper body of the seated occupant D against the seat back 16. As a result, the head H of the seated occupant D can be prevented from being far outside the range of protection of the multidirectional airbag 30 as the multidirectional airbag 30 is being inflated and deployed, and the multidirectional airbag 30 can be prevented from interfering with the head H of the seated occupant D.

Furthermore, the multidirectional airbag 30 becomes inflated and deployed after the predetermined amount of the belt 28 has been taken up. Because of this, even in a case in which the upper body of the seated occupant D is away from the seat back 16 before the activation of the pretensioner 64, by taking up the predetermined amount of the belt 28, the upper body of the seated occupant D can be moved toward the seat back 16 before the inflation and deployment of the multidirectional airbag 30. That is, compared to a configuration where the multidirectional airbag 30 becomes inflated and deployed immediately after the pretensioner 64 has been activated, the multidirectional airbag 30 as it is being inflated and deployed can be effectively prevented from interfering the head H of the seated occupant D.

Moreover, in the present embodiment, discomfort of the seated occupant D caused by tightening the shoulder belt 28S can be reduced by using the tension relaxing mechanism 65. Furthermore, even in a case in which the tension in the shoulder belt 28S has been relaxed, the upper body of the seated occupant D is supported by both the shoulder belt 28S and the multidirectional airbag 30, and so the ability to protect the seated occupant D can be ensured.

Moreover, in the occupant protection apparatus 10, the multidirectional airbag 30 is stored inside the module case 34 configuring the head rest 18. For this reason, compared to a configuration where a gas supply pipe is placed so as to surround the head of the occupant from above and normally projects into the cabin, an equivalent or greater ability to protect the occupant is ensured and the visual attractiveness of the occupant protection apparatus 10 before activation is good. Furthermore, the occupant protection apparatus 10 (mainly the multidirectional airbag device 20) does not hinder forward and rearward position adjustment, height adjustment, and reclining of the vehicle seat 12.

Furthermore, in the multidirectional airbag device 20 configuring the occupant protection apparatus 10, the multidirectional airbag 30 is positioned in the vertical direction relative to the seated occupant D as a result of the lower ends 44L of the lateral inflating parts 44 of the lateral deploying units 38 contacting the tops of the shoulders S of the seated occupant D. Because of this, the multidirectional airbag 30 can be inflated and deployed in an appropriate position in the vertical direction regardless of individual differences in the build and sitting posture of the seated occupant D. The ability of the multidirectional airbag 30 to restrain (restrict the movement of) the occupant is improved.

Furthermore, as the multidirectional airbag 30 is being inflated and deployed, the lateral inflating parts 44 become inflated and deployed via the front inflating part 42 (the first inflating portion 42A). Because of this, first the front inflating part 42 inflates and deploys and moves closer to the head H from the front, and thereafter the right and left lateral inflating parts 44 inflate and deploy and move closer to the head H from both the right and left sides. In other words, as the multidirectional airbag 30 is being inflated and deployed, the front inflating part 42 and the lateral inflating parts 44 gradually move closer the head H. Because of this, strong interference between the head H and the multidirectional airbag 30 as it is being inflated and deployed is controlled, and the ability of the multidirectional airbag 30 to restrain (restrict the movement of) the occupant is improved because the multidirectional airbag 30 moves closer to the head H after it is completely inflated and deployed. In particular, at the time of a crash such as a frontal crash in a case in which the vehicle seat 12 is facing the vehicle forward direction, inertial movement of the seated occupant D in the vehicle forward direction can be restricted as a result of the front inflating part 42 inflating first, and the head H can be restrained from both the right and left sides as a result of the lateral inflating parts 44 being inflated thereafter.

<Second Embodiment>

Next, an occupant protection apparatus 70 pertaining to a second embodiment of the present invention will be described with reference to the drawings. It should be noted that, regarding configurations that are the same as those in the first embodiment, the same reference signs will be assigned thereto and description thereof will be appropriately omitted.

Figure 9:
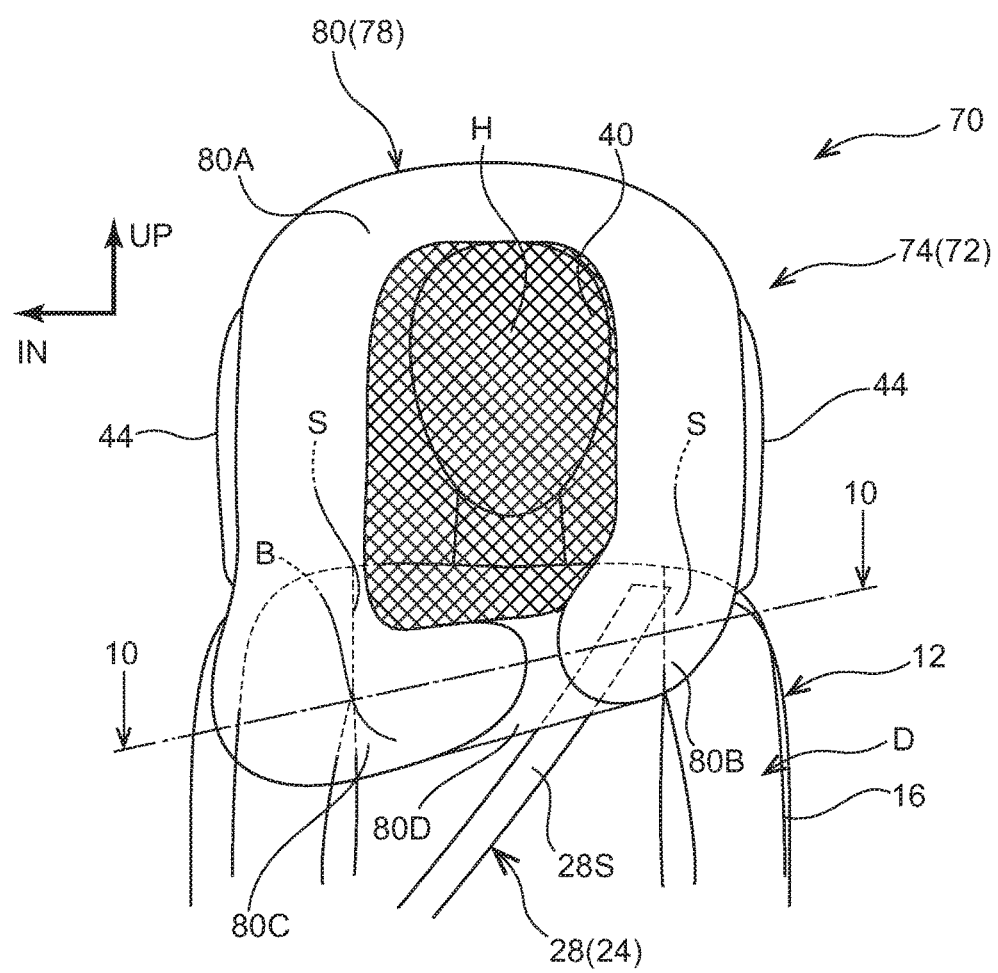
FIG. 9 is a front view of a multidirectional airbag configuring an occupant protection apparatus pertaining to a second embodiment.

As shown in FIG. 9, a multidirectional airbag 74 configuring a multidirectional airbag device 72 of the present embodiment is equipped with a front deploying unit 78 configured to include a mesh part 40 and a front inflating part 80. Furthermore, the front inflating part 80 includes a first inflating portion 80A, which becomes inflated and deployed along the upper edge and both the right and left side edges of the mesh part 40, and second inflating portions 80B and 80C, which are continuous with the lower side of the first inflating portion 80A on the right and left sides.

The second inflating portion 80B is positioned at a vehicle width direction outer side. That is, the second inflating portion 80B is positioned at one side (restraining side) in the seat width direction where the seated occupant D is restrained by the shoulder belt 28S. Furthermore, the second inflating portion 80C is positioned at a vehicle width direction central side. That is, the second inflating portion 80C is positioned at another side (the opposite side to the restraining side) in the seat width direction. Furthermore, the second inflating portion 80B and the second inflating portion 80C are both portions that inflate on the seat front side of the shoulders S of the seated occupant D and are mutually independent inflating and deploying portions on either side of a non-inflating portion 80D.

Figure 10:
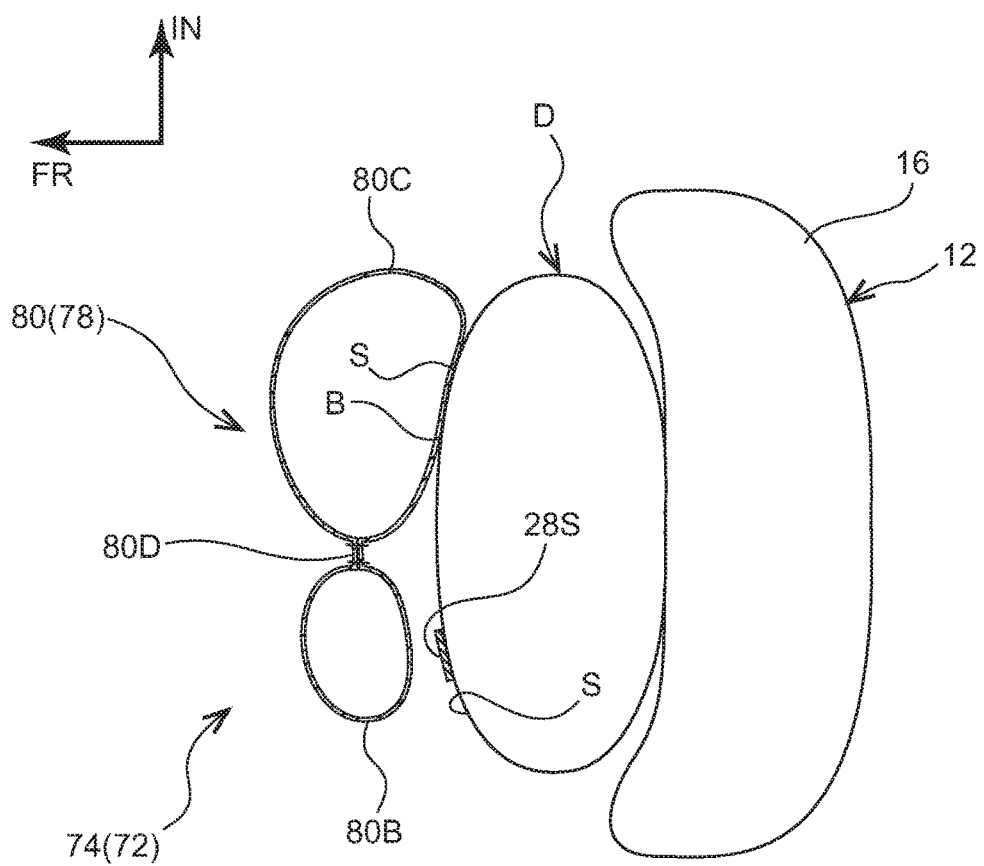
FIG. 10 is a sectional view showing a state in which the multidirectional airbag pertaining to the second embodiment is cut along line 10-10 of FIG. 9.

As shown in FIG. 10, the second inflating portion 80C positioned on the opposite side to the restraining side becomes inflated and deployed to a position closer to the shoulders S than the second inflating portion 80B positioned on the restraining side. Specifically, the second inflating portion 80C has a larger capacity than the second inflating portion 80B and has a larger inflated thickness in the forward and rearward direction than the second inflating portion 80B. Because of this, the shoulder S of the seated occupant D that is positioned on the opposite side to the restraining side and is not restrained by the shoulder belt 28S is restrained by the second inflating portion 80C, and the shoulder S on the shoulder belt 28S side is restrained by the second inflating portion 80B.

Furthermore, the multidirectional airbag 74 is equipped with a right and left pair of lateral inflating parts 44 like in the first embodiment. Here, among the right and left lateral inflating parts 44, the lateral inflating part 44 positioned on the other side (the opposite side to the restraining side) in the seat width direction becomes inflated and deployed at an earlier stage than the lateral inflating part 44 positioned on the one side (the restraining side) in the seat width direction where the seated occupant D is restrained by the shoulder belt 28S.

Specifically, like in the flat pattern (FIG. 6) of the first embodiment, the front ends of the right and left lateral inflating parts 44 are communicated with the lower ends of the first inflating portion 80A of the front inflating part 80. Additionally, although it is not shown in the drawings, the cross-sectional area of a gas flow path between the lateral inflating part 44 positioned on the opposite side to the restraining side and the front inflating part 80 is larger than the cross-sectional area of the gas flow path between the lateral inflating part 44 on the restraining side and the front inflating part 80. For this reason, at the time of the inflation and deployment of the multidirectional airbag 74, the gas from the inflator 32 first flows into the lateral inflating part 44 on the opposite side to the restraining side, so that the lateral inflating part 44 on the opposite side to the restraining side becomes inflated and deployed at an earlier stage than the lateral inflating part 44 on the restraining side.

(Action and Effects)

Next, the action and effects of the present embodiment will be described.

In the present embodiment, the second inflating portion 80C that inflates on the seat front side of the shoulder S, that is positioned on the opposite side to the restraining side and that is not restrained by the shoulder belt 28S, becomes inflated and deployed to a position closer to the shoulders S than the second inflating portion 80B on the restraining side. Because of this, inertial movement of the shoulder S that is not retrained by the shoulder belt 28S can be restricted, and the restrained state can be well maintained.

Furthermore, the second inflating portion 80C positioned on the opposite side to the restraining side has a larger capacity than the second inflating portion 80B positioned on the restraining side, so the second inflating portion 80C becomes inflated and deployed to a larger extent than the second inflating portion 80B. Because of this, the ability to restrain the shoulder S on the opposite side to the restraining side can be improved compared to a configuration where the second inflating portion 80B and the second inflating portion 80C have the same capacities.

Moreover, the shoulder S on the opposite side to the restraining side can be restrained at an early stage by inflating and deploying at an early stage the lateral inflating part 44 positioned on the opposite side to the restraining side. As a result, a part of the upper body, positioned at the opposite side to the restraining side of the seated occupant can be effectively prevented from moving due to inertia at the time of an impact to the vehicle or when the vehicle suddenly brakes. In particular, by increasing the cross-sectional area of the flow path of the gas to the second inflating portion 80C like in the present embodiment, the gas can be supplied first to the second inflating portion 80C by means of a simple configuration.

(Other Working Examples)

The first embodiment and the second embodiment of the present invention have been described above, but the present invention is not limited to the configurations described above and is of course implementable in a variety of ways in addition to the configurations described above. For example, in the first and second embodiments, the activation timing of the pretensioner 64 may also be changed in accordance with the build of the seated occupant D.

Specifically, in this example modification, a build detection sensor is disposed so that the build of the seated occupant D can be detected. As an example, a weight sensor disposed inside the seat cushion 14 may be used as the build detection sensor. In addition, a method may also be employed where the build of the seated occupant D is detected by calculating the size of the seated occupant D as recognized by an optical camera or the like. Furthermore, these methods may also be combined.

Figure 11:
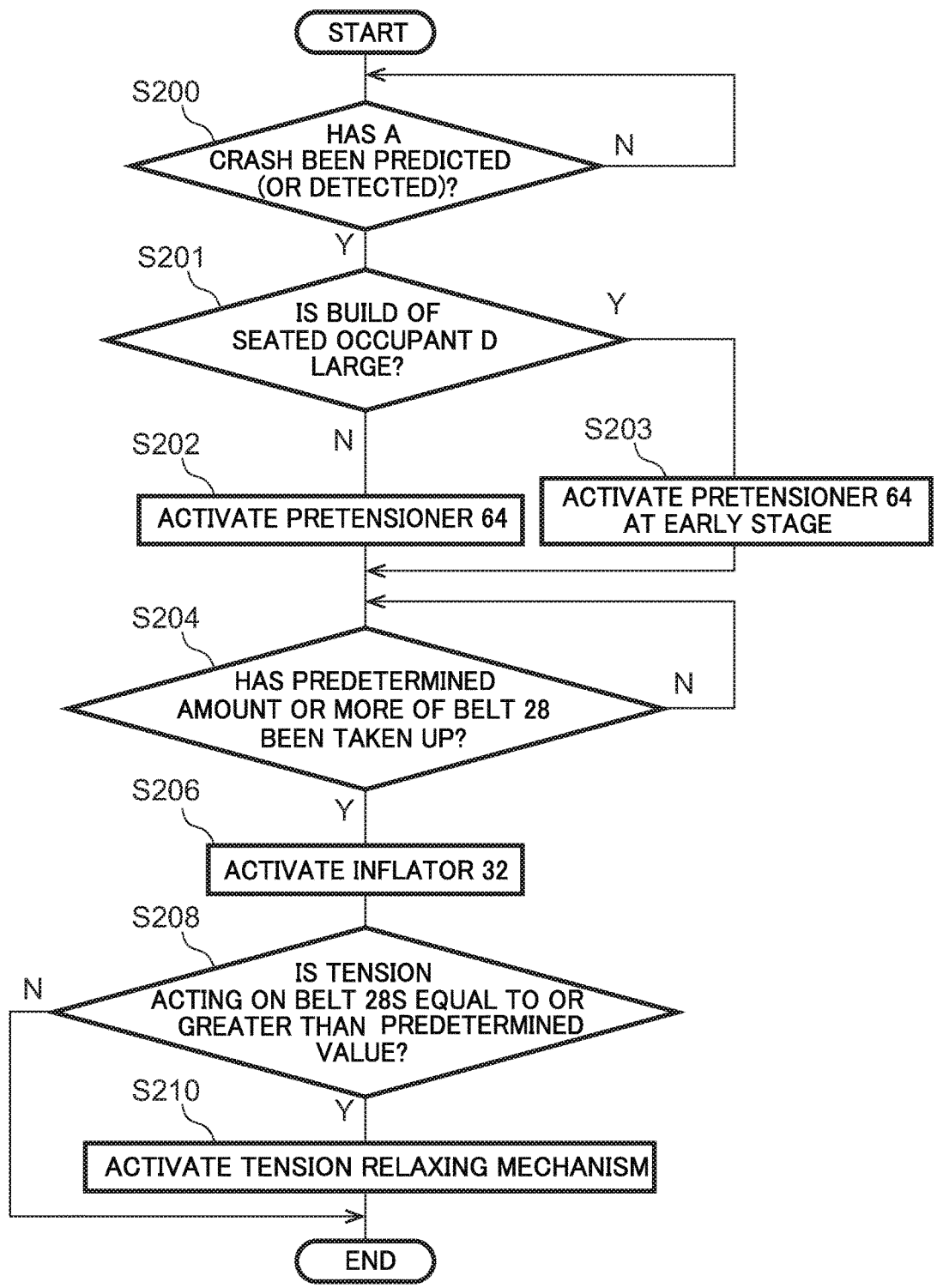
FIG. 11 is a flowchart showing an example of an activation sequence of an example modification of the occupant protection apparatus pertaining to the first embodiment.
Figure 12:
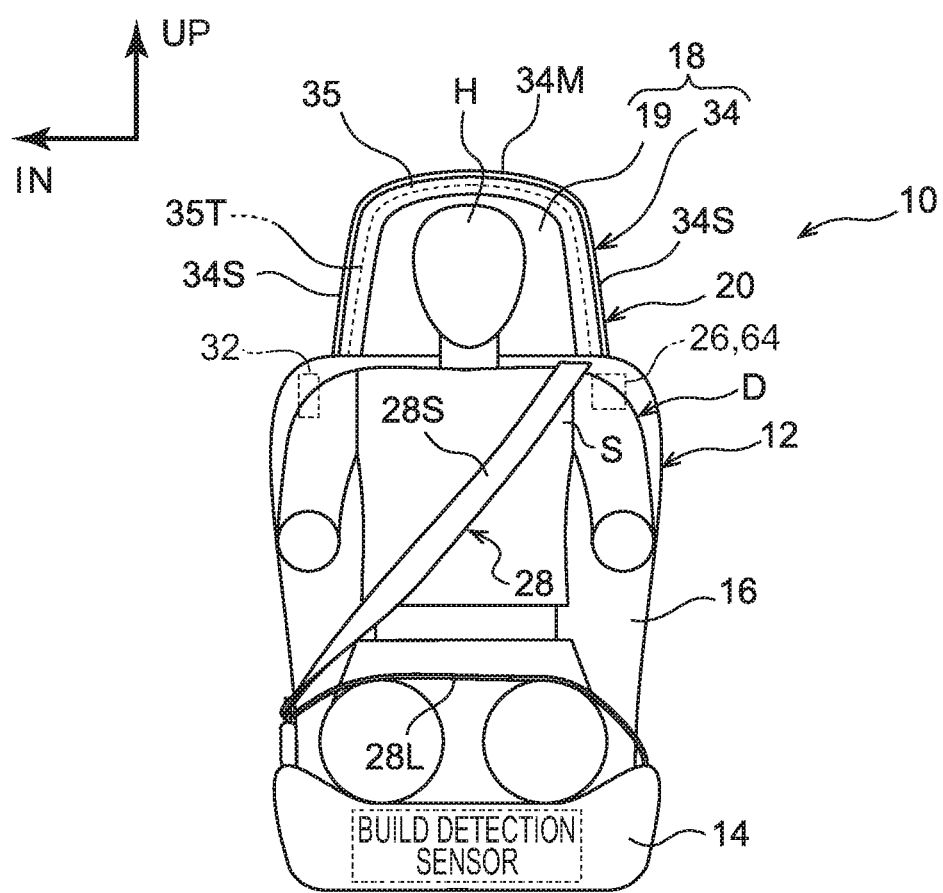
FIG. 12 is a front view showing the overall schematic configuration of an occupant protection apparatus pertaining to an embodiment.

An activation sequence of the ECU 60 pertaining to this example modification will be described using the flowchart of FIG. 11. In this flowchart, step S201 is disposed between step S200 and step S202 in the flowchart of FIG. 8. In step S201, the ECU 60 determines whether or not the build of the seated occupant D is larger than a preset condition.

In a case in which it has been determined in step S201 that the build is larger than the preset condition, the ECU 60 moves to step S203 and activates the pretensioner 64 at an early stage. Furthermore, if the determination is NO, the ECU 60 moves to step S202 and activates the pretensioner 64 at the normal timing (the same timing as in the first embodiment). Usually more time is needed to restrain an occupant with a relatively large build against the seat back 16 than an occupant with a relatively small build after tension is applied to the belt 28. For this reason, by activating the pretensioner 64 at an early stage in step S203, it can be made easier to move the head of even an occupant with a relatively large build to the range of protection of the airbag 30 by the time the multidirectional airbag 30 inflates and deploys. That is, the restraining ability of the occupant protection apparatus can be ensured regardless of the build of the occupant.

Furthermore, in the first and second embodiments, examples are described where the multidirectional airbags 30 and 74 are stored in the head rest 18, but the multidirectional airbag of the present invention may also be stored inside a vehicle seat in which the head rest and the seat back are integrated. In this case, the portion of the vehicle seat that supports the head of the occupant corresponds to the "head rest" of the present invention, and the portion of the vehicle seat that supports the back of the occupant corresponds to the "seat back" of the present invention. Additionally, the multidirectional airbag may also be stored so as to straddle the portion of the vehicle seat that supports the head of the occupant and the portion of the vehicle seat that supports the back of the occupant.

Moreover, in the first and second embodiments, the inflator 32 is stored in the head rest 18, but the inflator 32 may also be stored in the seat back 16. In this case, the gas can be smoothly supplied to the multidirectional airbag 30 by storing the inflator 32 upright and an end portion in which the gas discharge opening is disposed faces upward (toward the head rest 18).

Furthermore, as shown in FIG. 1, in a configuration where the retractor 26 and the pretensioner 64 are placed inside the seat back 16 on the seat left side (the one side in the seat width direction; the restraining side) where the seated occupant D is restrained by the shoulder belt 28S, it is preferred that the inflator 32 be stored on the seat right side. In this case, the inflator 32 becomes stored on the opposite side of the retractor 26 and the pretensioner 64 in the seat width direction, and space for placing the inflator 32 can be ensured without having to increase the size of the seat back 16. That is, if the inflator 32 were stored in the same position as the retractor 26 and the pretensioner 64, the forward and rearward direction thickness of the seat back 16 would need to be increased, and the need to increase the size of the vehicle seat 12 would arise. In contrast to this, if the configuration described above is employed, there is no need to increase the size of the seat back 16. Furthermore, by placing the pretensioner 64 inside the seat back 16 on the restraining side, tension can be directly applied to the shoulder belt 28S, so the structure becomes simple.

Moreover, in the first and second embodiments, the pretensioner 64 is employed as the belt take-up mechanism, however, instead of using the pretensioner 64, tension may also be applied to the belt 28 by using a motor to rotate the spool to take up the belt 28. In this case, compared to the pretensioner 64, sometimes it takes more time to take up the predetermined amount of the belt 28, but the tension acting on the belt 28 can be relaxed just by lowering the voltage applied to the motor, so there is no need to separately dispose a dedicated tension relaxing mechanism.

Furthermore, in the first and second embodiments, the occupant protection apparatus is equipped with the side airbag device 22, but the present invention may also have a configuration where the occupant protection apparatus is not equipped with the side airbag device 22. Furthermore, even when the occupant protection apparatus is equipped with the side airbag device 22, the occupant protection apparatus may also be configured to be equipped with a side airbag device disposed in a side door or the like. Furthermore, an example is described where the occupant protection apparatus is equipped with the side airbag device 22 on the vehicle width direction outer side, but the occupant protection apparatus may also be equipped with a side airbag device placed on the vehicle width direction central side instead of, or in addition to, the side airbag device 22 on the vehicle width direction outer side.

Furthermore, in the first and second embodiments, the seat width direction of the vehicle seat 12 coincides with the vehicle width direction, but the present invention is not limited to this. For example, the vehicle seat 12 may also be obliquely placed in relation to the vehicle body, and the direction the vehicle seat 12 faces may also be changeable (rotatable about a vertical shaft). In a configuration like this, a configuration equipped with the multidirectional airbag 30 that becomes inflated and deployed so as to surround the head H of the seated occupant D can contribute to good protection of the head H. Furthermore, the multidirectional airbag 30 before it is inflated and deployed is stored in the head rest, so it is difficult for the multidirectional airbag 30 to interfere with cabin interior surfaces and vehicle constituent parts, and changing the direction the vehicle seat 12 faces in relation to the vehicle body is not impeded.

Moreover, in the first and second embodiments, examples are described where the front deploying portions 36 and 78 configuring the multidirectional airbags 30 and 74 include the mesh part 40, but the present invention is not limited to this. For example, the present invention may also have a configuration disposed with a transparent sheet serving as a visible structure instead of the mesh part 40, and may also have a configuration that does not include a visible structure.

Furthermore, in the first embodiment, an example is described where the multidirectional airbag 30 is outer-roll-folded, but the multidirectional airbag 30 may also be folded up in another way, such as accordion-folded, and stored in the head rest 18 or the seat back 16.

Moreover, the seat belt device 24 of the first and second embodiments is an in-seat seat belt device where the retractor 26, the anchor 24A, and the buckle 24B are disposed in the vehicle seat 12, but the seat belt device 24 may also have a configuration where the retractor 26 is attached to a center pillar.

What is claimed is:

1. An occupant protection apparatus comprising:
   an airbag configured to be stored in a head rest or a seat back of a vehicle seat and being inflated and deployed by a supply of gas, the airbag being formed as a single bag that is configured to cover a head of an occupant and including a front inflating part, which is inflated at a seat front side of the head, and a right and left pair of lateral inflating parts, which are connected to the front inflating part and are inflated at seat lateral sides of the head;
   a three-point seat belt device including webbing equipped with a lap belt and a shoulder belt, and a belt take-up mechanism, the lap belt being adapted to restrain a pelvic region of the occupant, the shoulder belt being adapted to restrain an upper body of the occupant, and the belt take-up mechanism applying tension to the webbing;
   a control unit that, in the event that an impact to the vehicle has been predicted or detected, activates the belt take-up mechanism before inflating and deploying the airbag; and
   a build detection sensor configured to detect a build of the occupant seated in the vehicle seat,
   wherein, in a case in which the build of the occupant detected by the build detection sensor is larger than a predetermined value, the control unit activates the belt take-up mechanism at an earlier stage than in a case in which the build of the occupant is not larger than the predetermined value.

2. An occupant protection apparatus comprising:
   an airbag configured to be stored in a head rest or a seat back of a vehicle seat and being inflated and deployed by a supply of gas, the airbag being formed as a single bag that is configured to cover a head of an occupant and including a front inflating part, which is inflated at a seat front side of the head, and a right and left pair of lateral inflating parts, which are connected to the front inflating part and are inflated at seat lateral sides of the head;
   a three-point seat belt device including webbing equipped with a lap belt and a shoulder belt, and a belt take-up mechanism, the lap belt being adapted to restrain a pelvic region of the occupant, the shoulder belt being adapted to restrain an upper body of the occupant, and the belt take-up mechanism applying tension to the webbing; and
   a control unit that, in the event that an impact to the vehicle has been predicted or detected, activates the belt take-up mechanism before inflating and deploying the airbag,
   wherein the front inflating part is equipped with portions that inflate at the seat front side of shoulders of the occupant, with one portion being positioned at one side in a seat width direction where the occupant is restrained by the shoulder belt and with another portion being positioned at the other side in the seat width direction, and the other portion at the other side is inflated and deployed to a position closer to a shoulder of the occupant than the one portion at the one side, and
   wherein, among the portions of the front inflating part, the other portion at the other side in the seat width direction has a larger capacity than the one portion at the one side in the seat width direction.

3. An occupant protection apparatus comprising:
an airbag configured to be stored in a head rest or a seat back of a vehicle seat and being inflated and deployed by a supply of gas, the airbag being formed as a single bag that is configured to cover a head of an occupant and including a front inflating part, which is inflated at a seat front side of the head, and a right and left pair of lateral inflating parts, which are connected to the front inflating part and are inflated at seat lateral sides of the head;
a three-point seat belt device including webbing equipped with a lap belt and a shoulder belt, and a belt take-up mechanism, the lap belt being adapted to restrain a pelvic region of the occupant, the shoulder belt being adapted to restrain an upper body of the occupant, and the belt take-up mechanism applying tension to the webbing; and
a control unit that, in the event that an impact to the vehicle has been predicted or detected, activates the belt take-up mechanism before inflating and deploying the airbag,
wherein the front inflating part is equipped with portions that inflate at the seat front side of shoulders of the occupant, with one portion being positioned at one side in a seat width direction where the occupant is restrained by the shoulder belt and with another portion being positioned at the other side in the seat width direction, and the other portion at the other side is inflated and deployed to a position closer to a shoulder of the occupant than the one portion at the one side, and
wherein, among the right and left pair of lateral inflating parts, a lateral inflating part positioned at the other side in the seat width direction is inflated and deployed at an earlier stage than a lateral inflating part positioned at the one side in the seat width direction where the occupant is restrained by the shoulder belt.

4. An occupant protection apparatus comprising:
an airbag configured to be stored in a head rest or a seat back of a vehicle seat and being inflated and deployed by a supply of gas, the airbag being formed as a single bag that is configured to cover a head of an occupant and including a front inflating part, which is inflated at a seat front side of the head, and a right and left pair of lateral inflating parts, which are connected to the front inflating part and are inflated at seat lateral sides of the head;
a three-point seat belt device including webbing equipped with a lap belt and a shoulder belt, and a belt take-up mechanism, the lap belt being adapted to restrain a pelvic region of the occupant, the shoulder belt being adapted to restrain an upper body of the occupant, and the belt take-up mechanism applying tension to the webbing; and
a control unit that, in the event that an impact to the vehicle has been predicted or detected, activates the belt take-up mechanism before inflating and deploying the airbag,
wherein the front inflating part is equipped with portions that inflate at the seat front side of shoulders of the occupant, with one portion being positioned at one side in a seat width direction where the occupant is restrained by the shoulder belt and with another portion being positioned at the other side in the seat width direction, and the other portion at the other side is inflated and deployed to a position closer to a shoulder of the occupant than the one portion at the one side,
wherein, among the right and left pair of lateral inflating parts, a lateral inflating part positioned at the other side in the seat width direction is inflated and deployed at an earlier stage than a lateral inflating part positioned at the one side in the seat width direction where the occupant is restrained by the shoulder belt, and
wherein a cross-sectional area of a gas flow path, through which the gas flows into the lateral inflating part positioned at the other side in the seat width direction, is larger than a cross-sectional area of another gas flow path, through which the gas flows into the lateral inflating part positioned at the one side in the seat width direction.

5. An occupant protection apparatus comprising:
an airbag configured to be stored in a head rest or a seat back of a vehicle seat and being inflated and deployed by a supply of gas, the airbag being formed as a single bag that is configured to cover a head of an occupant and including a front inflating part, which is inflated at a seat front side of the head, and a right and left pair of lateral inflating parts, which are connected to the front inflating part and are inflated at seat lateral sides of the head;
a three-point seat belt device including webbing equipped with a lap belt and a shoulder belt, and a belt take-up mechanism, the lap belt being adapted to restrain a pelvic region of the occupant, the shoulder belt being adapted to restrain an upper body of the occupant, and the belt take-up mechanism applying tension to the webbing; and
a control unit that, in the event that an impact to the vehicle has been predicted or detected, activates the belt take-up mechanism before inflating and deploying the airbag,
wherein the lateral inflating parts are inflated as a result of the gas being supplied thereto via the front inflating portion.

* * * * *